United States Patent
Mancuso et al.

(10) Patent No.: US 9,549,329 B2
(45) Date of Patent: Jan. 17, 2017

(54) REMOTELY CONFIGURABLE MOBILE WIRELESS ACCESS POINT DEVICE

(71) Applicant: Verizon Patent and Licensing Inc., Arlington, VA (US)

(72) Inventors: Steven Mancuso, Lebanon, NJ (US); Christopher Lee Rutledge, Somerset, NJ (US); Rajendra K. Damle, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 14/540,473

(22) Filed: Nov. 13, 2014

(65) Prior Publication Data

US 2016/0143028 A1    May 19, 2016

(51) Int. Cl.
*H04W 24/02*  (2009.01)
*H04W 12/00*  (2009.01)
*H04L 29/06*  (2006.01)
*H04W 12/08*  (2009.01)
H04W 88/08  (2009.01)
H04W 88/12  (2009.01)

(52) U.S. Cl.
CPC .............. *H04W 24/02* (2013.01); *H04L 63/20* (2013.01); *H04W 12/00* (2013.01); *H04W 12/08* (2013.01); H04W 88/085 (2013.01); H04W 88/12 (2013.01)

(58) Field of Classification Search
CPC . H04W 72/0433; H04W 88/12; H04W 88/085
See application file for complete search history.

(56) References Cited

U.S. PATENT DOCUMENTS

| 6,708,187 | B1* | 3/2004 | Shanumgam | ....... H04L 41/0233 |
| 9,137,262 | B2* | 9/2015 | Qureshi | .................. H04L 63/20 |
| 9,332,486 | B2* | 5/2016 | Scherzer | ............... H04W 48/16 |
| 2005/0210267 | A1* | 9/2005 | Sugano | ............... H04L 63/0846 713/186 |
| 2005/0239460 | A1* | 10/2005 | Kroth | ................ H04W 72/0486 455/434 |
| 2008/0244148 | A1* | 10/2008 | Nix, Jr. | ............... H04L 41/0856 710/313 |
| 2013/0111572 | A1 | 5/2013 | Gaddam et al. | |
| 2013/0117382 | A1 | 5/2013 | Gaddam et al. | |
| 2014/0055344 | A1* | 2/2014 | Seo | ....................... G06F 3/0487 345/156 |
| 2014/0194097 | A1 | 7/2014 | Gaddam et al. | |

(Continued)

Primary Examiner — Mohammad Anwar

(57) ABSTRACT

Provided is an intelligent mobile wireless access point device that is set-up to allow for remote configuration of the access point device, via a mobile communication network, by a configuration server. A configuration file for a mobile wireless access point device is maintained by a service provider in a configuration server. The configuration file is delivered to the mobile wireless access point devices over the mobile communication network, which allows multiple mobile wireless access point devices to be configured substantially simultaneously and without the multiple mobile wireless access point devices being physically located at an enterprise location. In addition, the remote configuration examples of a mobile wireless access point device mitigate the opportunities for unauthorized use of the mobile wireless access point, and provide additional security features for authorized users.

20 Claims, 4 Drawing Sheets

(56) References Cited

U.S. PATENT DOCUMENTS

2014/0215062 A1 7/2014 Anugu
2014/0349677 A1* 11/2014 Xiao .................. H04W 4/02
455/456.1

* cited by examiner

100

200

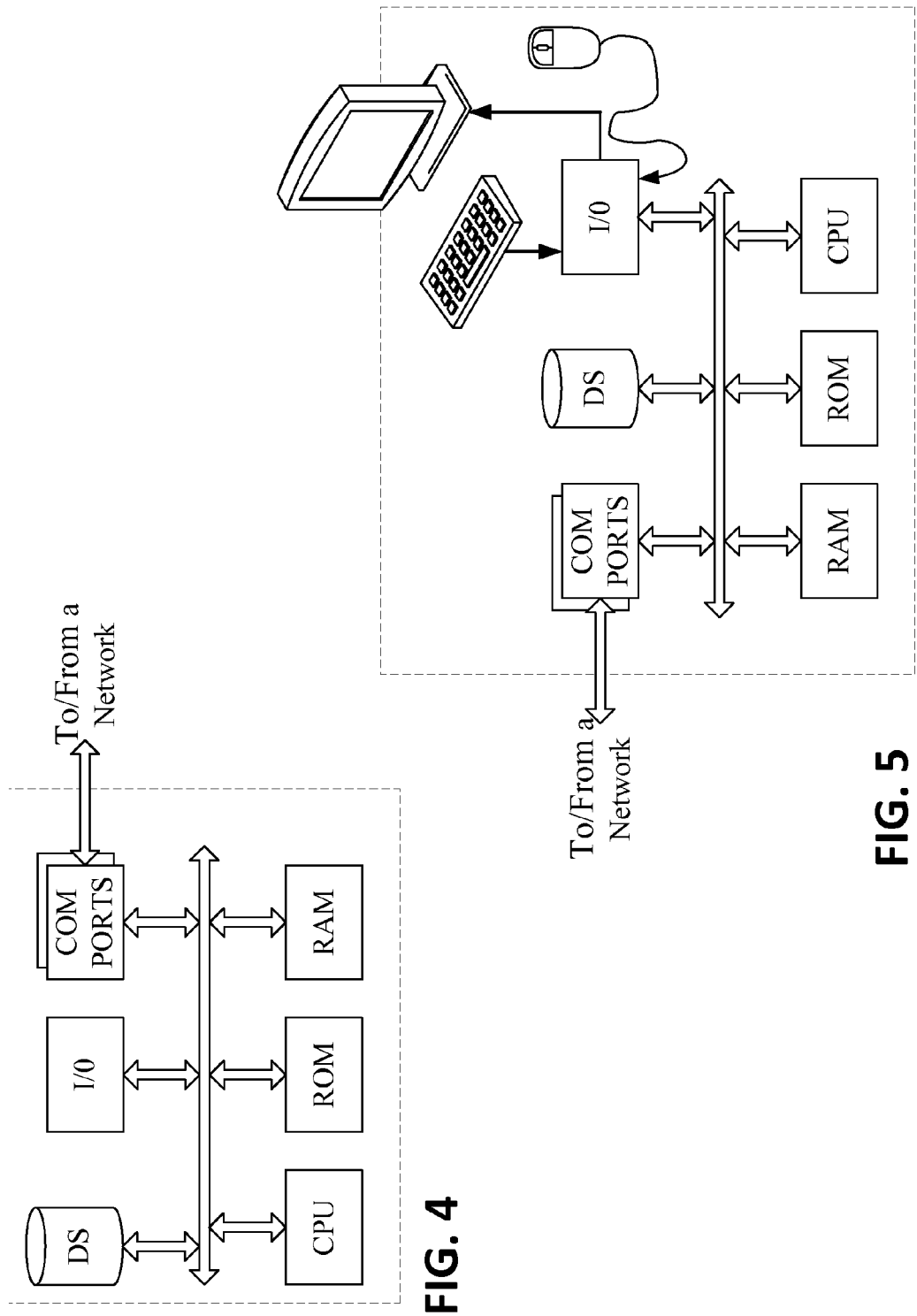

REMOTELY CONFIGURABLE MOBILE WIRELESS ACCESS POINT DEVICE

BACKGROUND

Business mobility continues to evolve from controlled environments in which information technology (IT) departments dictate hardware, software/applications, carrier/plan, and release schedules, to fragmented environments driven by advances in hardware, form-factors, different operating systems and applications, resulting in increasingly less control for the enterprise business across the mobility ecosystem used by personnel of the business enterprise.

The practice of "Bring Your Own Device" (BYOD) is perpetuating the challenge with numerous "Smart End Points" (SEPs) including smartphones, tablets and laptops, being leveraged to access corporate assets. BYOD implies each end-user makes the decision on device type and thus the operating system, and in an increasing number of cases, each end-user makes the decisions as to the carrier, the carrier's service plan, applications and the network connection. IT department control and influence over standardization is circumvented, resulting in an absence of consistency and in an ever-increasing complexity of policy management challenges. For example, challenges include the development of consistent and equitable methods for employee reimbursement for "business usage" across multiple carriers and varying connectivity plans; consistent enforcement of policies associated with connection-security for mobile devices when accessing business resources; issues related to leveraging incumbent virtual private network solutions; multiple and rapidly changing mobile device form factors; multiple and rapidly evolving operating systems and/or applications; multiple connectivity service providers (e.g., Wi-Fi provider at different locations (e.g., coffee shop, library, public parks and the like), cellular, wireline, and the like), a wide variance of connectivity service plans and pricing.

Such management challenges are exacerbated with the current mobile wireless access point devices also referred to as "mobile hotspot" devices, such as the MiFi® and Jetpack® devices, and in-vehicle Wi-Fi hotspots, that provide access to the Internet for various Wi-Fi enabled devices, such as a smartphone, laptop or tablet and the like, through a cellular data connection. A mobile wireless access point device typically only provides WiFi or similar wireless local area network connectivity to local end user devices and routes communications of the end user device to/from the Internet via a mobile wireless wide area communication network service, e.g. via a public cellular data network. In other words, a mobile wireless access point as discussed herein is a device that is dedicated to providing wireless access for end user devices to data communication networks and that is unequipped to provide the direct voice communication functions of a cellular telephone or a smartphone. The mobile wireless access point device includes universal serial bus (USB) port or other wired connection port that allows tethering as well as allowing an enterprise IT administrator to access the configuration settings of the mobile wireless hotspot device. Such mobile wireless hotspot devices, which are separate and different from a smartphone, are targeted to consumers so the consumer can access the Internet from various devices, which may not have mobile wide area communication service or have more expensive mobile wide area communication service, through the mobile wireless access point device data connection. The mobile wireless access point device allows the user to manage the mobile wireless access point device either via an on-device user interface (UI) or through a server-based configuration manager application that requires an IT administrator of the device owner to physically connect to the mobile wireless access point device and change settings via the IT administrator's desktop UI that is similar to a web-browser. This server-based configuration manager application may be hosted on a server and may interact with a web client that is local to the mobile wireless access point device. Presently, the configuration settings of the mobile hotspot cannot be remotely accessed by the enterprise's IT administrator. It is anticipated that the challenge will also exist with in-vehicle mobile hotspots.

Enterprise customers also are distributing mobile hotspot devices to their workforce in increasing numbers. As a result, the enterprise IT administrators must spend more time manually configuring and assigning each of the mobile hotspot devices for distributed to respective workforce employees. Enterprise customers will be faced with the same challenge when leveraging the hotspot capability in corporate owned vehicles.

While enterprise customers deploying mobile wireless access point devices to their employees want the ability to remotely manage mobile wireless access point devices, presently there is no mechanism for securely providing remote configuration. The limitations of having to have physical possession of the mobile wireless access point device to configure or reconfigure the mobile wireless access point device are further magnified when the mobile wireless access point device user may be located in locations remote from IT administrators. Furthermore, since large scale use of mobile wireless access point devices in which tens or hundreds of mobile wireless access point devices are deployed at a single time with similar configurations, present enterprise IT administrators only have limited time and resource to manually manage the configuration of each of the tens or hundreds of mobile wireless access point devices. In order to maintain the enterprise's mobile wireless access point device, IT organizations spend considerable time and money executing their deployment and support processes. In some instances, remote employees even have to ship their mobile wireless access point device back to headquarters to get their mobile wireless access point device reconfigured.

In addition to having to manually configure/reconfigure mobile wireless access point devices, the security features of the present day mobile wireless access point devices may be bypassed by an employee or other user by performing a factory reset of the mobile hotspot device, which changes all of the security settings made by the enterprise IT administrator to the factory default settings of the mobile wireless access point device. The factory default settings include a standard password, e.g., "guest" or "Admin" and login name. Now without a proper secure configuration, an unauthorized user, e.g., an enterprise employee's child may be able to access the Internet via the mobile communication network, which may incur additional and unauthorized charges to the enterprise mobile communication network subscriber account for the mobile wireless access point device and possibly allow an unauthorized user access to an enterprise network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured as a host or server, for example, to function as the service provider wireless access point configuration server in the system of FIG. 1.

FIG. 5 is a simplified functional block diagram of a personal computer or other work station or terminal device.

DETAILED DESCRIPTION OF EXAMPLES

Figure 1:
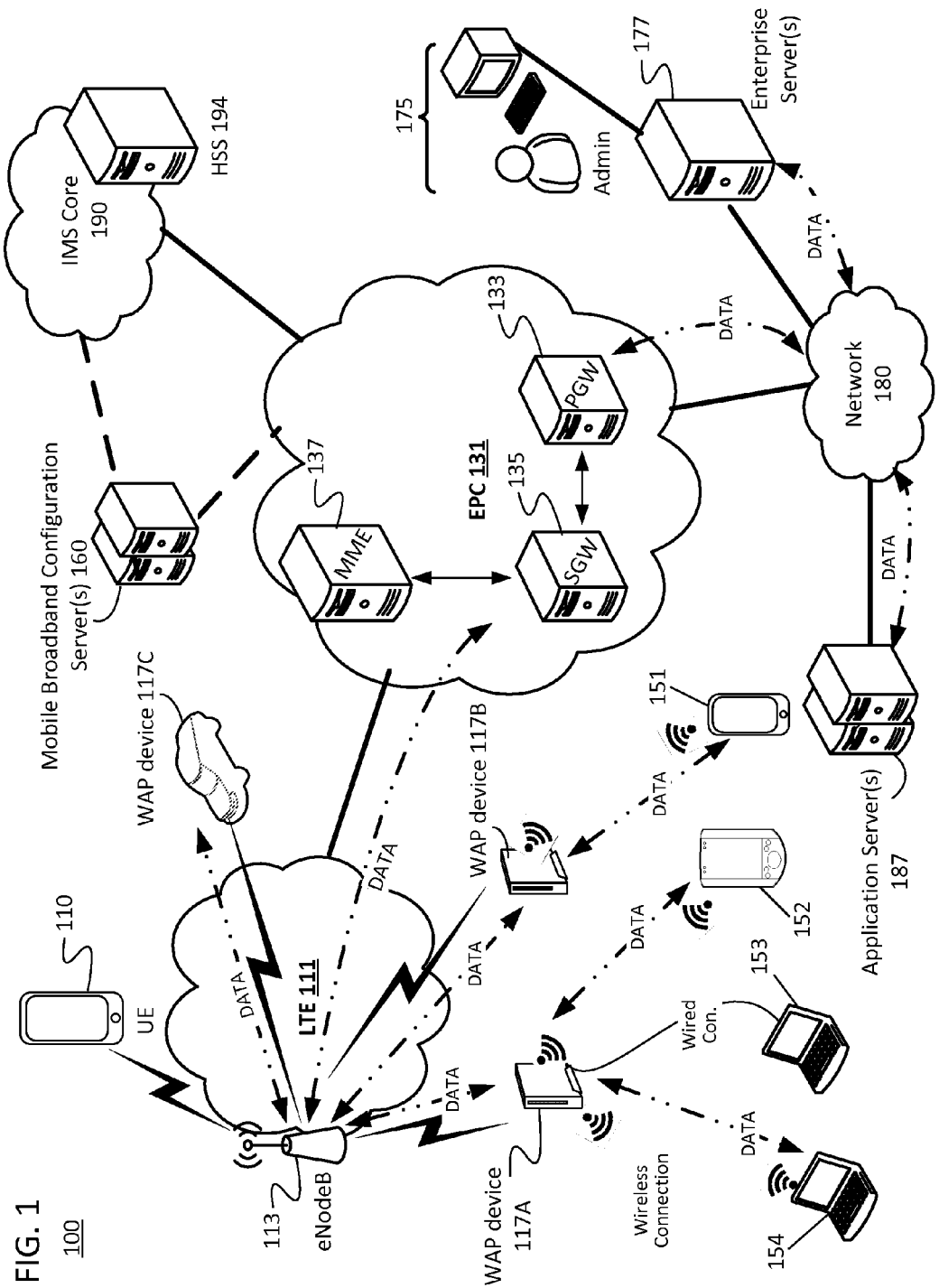
FIG. 1 is a high-level functional block diagram of an example of a system including mobile cellular communication networks, data communication networks and devices that provide data connections and support an example of the mobile wireless access point configuration setting process described herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a mobile wireless access point device that is configured to securely pair with an end user device and provide access to a data network, such as the Internet or an enterprise network. The mobile wireless access point securely pairs with the end user device through a short-range communication medium, such as Bluetooth Wi-Fi or other local area wireless network technology. The mobile wireless access point provides the access to the data network by attaching, via a mobile network transceiver and a mobile wide area communication network.

For configuration purposes, the wireless communication capabilities enable connection of the mobile wireless access point device to a mobile broadband configuration server (which is also referred to as "configuration server"). The mobile broadband configuration server provides the mobile wireless access point with a configuration file. Upon receipt of the configuration file, the mobile wireless access point adjusts settings according to the configuration file. Each time the mobile wireless access point powers up or at a frequency determined by the IT Administrator, the mobile wireless access point obtains a configuration file from the mobile broadband configuration server. The described examples illustrate an administrative control over both the end point device and the connectivity device from the same configuration portal platform.

A configuration file is a data file that contains a number of operational rules that are to be used by a mobile wireless access point device processor when interacting with an end user device. An operation rule is logic implemented by the mobile wireless access point device processor for controlling access to a data communication network through the wireless access point device. The operational rules include a number of configuration parameter settings that dictate use of the mobile wireless access point device by a user device, including the extent of access to a data communication network that is provided to a user of the wireless access point device. For example, an operational rule may limit the duration of a user's access to the data communication network, whether the user's wireless access point device is permitted to allow access to other enterprise users, or the like. The operational rules are implemented based on configuration parameter settings made by an IT administrator. The configuration parameters are settable by an IT administrator, who may be the owner or an enterprise's manager of the mobile wireless access point device, through, for example, an IT administrator UI provided by via a configuration server.

The configuration parameter settings, for example, include settings for data usage limits, connection time limits, permitted/prohibited websites settings, permissible end user device settings, designation of device user status, e.g., implementation settings, such as flags indicating that the device is part of a mesh network, a number of end user devices permitted to connect to the device; settings to indicate an additional set of rules or settings stored in a data store (these settings include memory addresses (either on the device or at a server) for lists related to the respective set of rules or settings (described in more detail below). The configuration parameter settings may be incorporated as values in a configuration file. For example, the uniform resource locators of the permitted or prohibited websites may be provided in the configuration file. The permissible end user devices may be identified based on a media access code (MAC) of end user device. A designated user may be a parent, child, supervisor, employee, work group and the like and an appropriate configuration parameter setting, or value, may be used to indicate the user status, which may be used by the configuration server for determining privileges related to the subscriber accounts and other subscriber related information. The configuration parameters are stored in a configuration file associated with the specific mobile wireless access point device and/or with subscriber-related information, such as an identifier.

In addition to including configuration parameter settings for interacting with end user devices, the configuration file also includes settings for functions related to the information provided to a user and the inputs that can be accepted via a user interface with the mobile wireless access point device. For example, the configuration file includes settings that the mobile wireless access point device interprets according to a common set of operational rules as those used by the IT administrator to determine the types of menus and user information, such as, passwords, user name or the like, that will be presented on a UI of the mobile wireless access point device, as well as location restrictions for the mobile wireless access point device, and the like. The configuration file may be updated by the IT administrator from time to time. In an example, the configuration file, whether updated or not, is delivered to the mobile wireless access point device in response to every power ON or reset of the mobile wireless access point device. The configuration file may be delivered by mobile broadband configuration server at other times as well in order to provide the latest, most up-to-date configuration file or to insure that a configuration of a mobile wireless access point has not been corrupted since the last occurrence of a power ON or reset. For example, an IT administrator may implement an operational rule by setting a configuration parameter that causes mobile wireless access point to generate a request for delivery of a latest configuration file because the mobile wireless access point device has not been turned OFF within a predefined time period or an updated configuration file has not been delivered to the mobile wireless access point device in the predefined time period, such as 24 hours, or 48 hours. In response to not being turned OFF or receiving an updated configuration file within the predefined time period, the mobile wireless access point device sends a request to the mobile broadband configuration server requesting deliver of an updated configuration file, if available. Alternatively, the mobile wireless access point device may send a request for an updated configuration file when a certain data usage limit has passed, such as the connected end user device(s) have consumed half of the subscribed data usage limit.

In another example, the mobile broadband configuration server is configured by the IT administrator selecting different settings within the agent software executing on the mobile broadband configuration server to deliver configuration files at different times. For example, the IT administrator selects a setting of every 24 hours for the mobile broadband configuration server to determine whether the configuration file for the respective wireless access point device has been updated. In response to the configuration file being updated, the mobile broadband configuration server delivers the updated configuration file to the respective mobile wireless access point device. In response to the configuration file not being updated, the mobile broadband configuration server waits another selected period, in the example, 24 hours to again perform a check to determine whether the configuration file for the respective mobile wireless access point has been updated. In this example, the latest configuration file is only an updated configuration file. However, in other examples, the latest configuration file is either the same configuration file previously delivered to the mobile wireless access point device or is an updated configuration file.

By maintaining a configuration file at a secure location and by delivering a configuration file at server check-in and other times from a remote location, an improved method is provided that reduces unauthorized use of the mobile wireless access point device and allows for remote configuration of the mobile wireless access point device to be configured remotely. In other words, the user does not have to physically return the mobile wireless access point device to the IT administrator for configuration updates, but the mobile wireless access point device will periodically check in with the server to update the configuration as necessary.

The described examples are implemented in a Long Term Evolution (LTE) network environment, although the enhanced mobility may be utilized in wireless networks based on other mobile wireless technologies. The LTE network environment, in the examples, operates according to a Third Generation Partnership Project (3GPP) standard (i.e., the LTE standard) for mobile network technology. The LTE standard describes requirements for mobile communications systems in evolved or advanced cellular broadband technologies. Such requirements include Evolved Universal Mobile Telecommunications System (UMTS) Terrestrial Radio Access Network (E-UTRAN), which is a wireless network technology that implements a high-speed radio access technique to meet increased network demands, including improving user throughputs and network capacity, reducing latency, and increasing mobility.

By way of example, within a LTE network, management of wireless access point devices is facilitated by data traversing one or more wireless nodes (e.g., one or more eNodeBs) to which end user equipment (UE) devices may be attached without traversing higher layers of the LTE mobile communication network. However, wireless access point device management may be applicable to networks other than the LTE network. In this regard, the term "network," as used herein, is intended to be broadly interpreted to include a wireless network (e.g., mobile network, cellular network, non-cellular network, etc.).

The LTE network environment is provided by a mobile communication (i.e., cellular) network operator that also provides the mobile communication network infrastructure to provide packet data communication services. The same mobile communication network operator, in addition to the packet data communication services, in some examples, provides additional services usable by individual user subscribers as well as enterprise subscribers, such as businesses, government entities, and other public or private organizations. In other words, the mobile communication network operator is the service provider of the additional services. In other examples, the service provider is a third party working with the mobile communication network operator. Of course, the mobile communication network operator provides the appropriate safeguards and security measures for maintaining the confidentiality of any enterprise subscriber information. Examples of the additional services for enterprises include technical, hardware and device support for managing individual users (i.e., employees) and enterprise mobile communication devices that operate over the service provider's mobile communication network that are used or deployed by the enterprise. For example, a trusted employee or employees of the enterprise, e.g. IT personnel or other staff designated to serve as the enterprises mobile service administrator or the like, may be able to access a service provider service platform or portal that provides a variety of IT administrator user interfaces allowing the administrator to manage all of the mobile communication-enabled devices by interacting with a mobile broadband configuration server. Through the IT administrator user interfaces, the trusted employee, IT administrator is able to modify and adjust configuration parameter settings of different operational rules of the service provider service platform or portal provides the administrator with access to enterprise's subscriber account information.

Reference now is made in detail to the examples illustrated in the accompanying drawings and discussed below.

FIG. 1 is a diagram of an example environment 100 in which systems and/or methods described herein may be implemented. As shown in FIG. 1, environment 100 may include a mobile device or UE 110, a LTE type radio access network (RAN) 111, an evolved packet core (EPC) network 131, an Internet protocol (IP) multimedia subsystem (IMS) core network 190 and a data communication network 180, such as the Internet. The respective networks 111, 131, 180 and 190 are interconnected via wired or wireless connections.

The LTE network 111, for example, is a radio access network (RAN) that includes a number of network components that provide packet data transport services to user equipment (UE), such as UE 110. For example, the LTE network 111 includes one or more end user devices that attach to the LTE network in order to exchange voice and/or data with other end user devices as well as application servers 187 and enterprise servers 177 via the EPC network 131. In one example implementation, the LTE network 111 includes a one or more base stations implemented, for example, as eNodeB (eNB) 113 to provide a radio access point to the LTE network 111. The eNB 113 may connect to the LTE network 111 via a wired or wireless connection. In addition to providing packet data transport services to UE 110, the LTE network also provides packet data transport services to mobile wireless access point devices, such as WAP devices 117A, 117B and 117C. The packet data transport services provided by the LTE network enable users to connect to WAP devices, such as WAP devices 117A-117C, and access data communication networks, such as 180, and any servers, such as 187 or 177, connected to the network 180. A wireless mobile communication network, or cellular communication network, as discussed herein and generally referenced by element number 120 in FIG. 2, includes, for example, one or more RANs, such as the LTE RAN 111 network, and the EPC 131, but may rely on information or services provided by one or more components of the IMS core network 190. Of course, various wireless mobile communication network implementations utilizing the different combinations of components of each of the LTE RAN 111 network, the EPC 131 and the IMS core network 190 or their respective functionality may be utilized to provide the mobile wireless access point device configuration and device management settings and functions as discussed herein.

The WAP devices 117A-117C are mobile wireless access point devices that a user may use to connect to the LTE network 111 and EPC network 131 (and, in some cases, through other wireless access networks (and/or intermediate networks)) to access servers, such as application servers 187 and enterprise servers 177. A mobile WAP device 117A or 117B is a wireless router-like device that connects with one or more user devices, such as end point devices 151-154 and provides connectivity to a data communication network, such as 180, in order for the user device to exchange data communications with servers or other users connected to the data communication network 180. The vehicular WAP device 117C, in some examples, may be on-board a vehicle, such as an automobile, a commuter bus, train, camper or other transportation. In other examples, the mobile WAP device 117C is integrated in the vehicle and, in some cases, may utilize systems of the respective vehicles, such as electrical power systems and navigation. Examples of enterprises that may implement WAP devices, such as WAP device 117C, include vehicle manufacturers, owners of corporate vehicle fleets, vehicle rental companies and the like. Each mobile WAP device 117A and 117B, in some examples, is provided with a global positioning system (GPS) receiver, and is capable of providing location information to the mobile broadband configuration server 160. For example, the data communication network 180 is the Internet and a respective user device (e.g. 151) is able to connect to a third party e-mail server or an enterprise data network. In an example, a mobile WAP device 117A or 117B is the property of an enterprise, such as the enterprise that provides the enterprise servers 177 connected the data communication network 180. The Enterprise (not shown), for example, subscribes to the WAP device/end user device configuration management service provided by the service provider (which may be the mobile wide area communication network provider).

Each Enterprise-provided WAP device 117A-C is configurable according to the Enterprise's subscription for mobile communication network data communication services. For example, the relationship between the MNO that provides the LTE 111 network, the EPC 131, IMS core 190 and connectivity to the data communication network 180 and the Enterprise determines the extent of the services that are provided to the Enterprise through the service provider mobile broadband configuration servers 160 and the enterprise server 177. The MNO-Enterprise relationship may be based on an amount of data usage for each WAP device 117A-C, an amount of configuration control of WAP devices provided to the Enterprise Admin 175, use of service provider resources, and the like. The Enterprise Admin 175 is, for example, an information technology (IT) administrator group or division for the respective business Enterprise. As is typical for an enterprise, the Admin 175 has responsibility for configuring end user devices including mobile hotspots for the Enterprise. However, the described examples provide atypical additional capabilities and increased functionality that permit the Admin 175 to completely manage the configuration and security features of the enterprise's mobile communication-enabled devices, such as WAP devices 117A-C. The Admin 175 via a computer and the enterprise server 177 connection to the network 180 is able to access a web portal in the service provider mobile broadband configuration servers 160 to manage MNO configuration settings (described in more detail below) of an enterprise's mobile communication-enabled devices. For example, the enterprise Admin 175 is able to manage the configuration of several WAP devices, such as 117A and 117B, through a portal of the mobile broadband configuration server 160. On the mobile broadband configuration server 160 side, the Admin 175 inputs, for example, the MDN (from a universal integrated circuit card) or IMEI of the WAP devices and is able to place all of the WAP devices in a group, such as sales, and configuration parameter settings (or if previously stored in a configuration file, copy a previously-stored configuration file) as an input to a user interface of the portal.

In an example, the mobile broadband configuration server 160 is coupled to a cloud system or other system that provides the functionality via the cloud (not shown) or IMS core 190 or EPS core 131. For example, the mobile broadband configuration server 160 is implemented as a cloud-based service. Through an agent executing on the mobile broadband configuration server 160, the enterprise IT administrator has multiple capabilities via the UI portal from the enterprise IT administrator device 175 to the mobile broadband configuration server 160. For example, the enterprise IT administrator device 175 can set up groups or segments. For example, a password policy may apply to all users, while a certain application implementation may apply to a specific segment of workers or a particular regions (e.g., East coast of US), or role (e.g., legal, marketing or engineering).

Also envisioned are examples in which configuration settings change in response to certain conditions. For example, the configuration server 160 based on information provided by the WAP device 117A-C, such as GPS location information, automatically place user in a group based on user actions based on geography. Such an example is when the WAP device 117A or 117C is at a geographical location in which the mobile communication network (i.e., home mobile communication network) to which WAP device subscribes is unavailable, but another mobile communication network (i.e., visited mobile communication network) is available. However, roaming charges will be incurred by use of the WAP device through the visited mobile communication network. To minimize the cost or prevent the incursion of the roaming charges by using the visiting mobile communication network, the enterprise IT administrator 175 may have a configuration setting made via the portal to the mobile broadband configuration server 160 that prohibits the WAP device 117A from attaching to the visiting mobile communication network. Preventing the incursion of roaming charges or minimizing cost is accomplished, for example, by changing the sign-on credentials of the WAP device in the WAP configuration file when the WAP device powers up. In other words, the mobile wide area communications service is diverted until the home mobile wide area communication network (or a mobile communication network that does not incur roaming charges) is available. The configuration settings may also change according to different events based on different actions. The different events may be set according to time and/or geography. For example, the WAP device is loaned to a user for a business trip, in which case the configuration settings that permit use of the WAP device may be set for only a duration of the business trip (e.g., one day, 12 hours, one week and the like), or the business trip is to the West coast of the US, in which case the home network settings may be changed to include West Coast-serving mobile communication networks that are partners of the user's home mobile communication network so that roaming charges are avoided. Alternatively, a combination of both time and geography may also be implemented.

Examples of an enterprise's mobile communication-enabled devices include the WAP devices 117A and 177B, end user devices 151-154 and UE 110 as well as other devices. The end user devices 151-154 and UE 110, which may be a tablet (e.g., 152), laptop computer (e.g., 151, 153 and 154), a personal computer, a workstation, a smartphone (e.g., UE 110) or the like. The WAP devices 117A and 177B are configured to connect to the end user devices 151-154 via a wired or wireless communication interface. For example, WAP devices 117A and 117B is configured for local wireless communications via one or more local wireless communication protocols with an end user device, such as Wi-Fi (i.e., one or more of the 802.11xx standard communication protocols), one or more of the Bluetooth standards, or another wireless communication protocol. In addition or alternatively, the respective WAP device 117A or 117B may be configured to communicate via a wired connection such as a universal serial bus (USB) connection. Examples of other devices include vending machines (e.g., beverage, snacks), kiosks, remote security systems (e.g., a monitoring station in a remote location but with cellular connectivity), entry devices (e.g., door locks), and the like.

In the current LTE example, the network 111 utilizes packet switching. For convenience, switches and/or routers for handling the flow of packets through the LTE network 111 are omitted. For example, the eNB 113 is an enhanced base station that acts as an interface between the mobile device and the mobile network. MME 137 is a control-node for the communication access network. For example, the eNB 113 is used for idle mode mobile device tracking and paging procedure including retransmissions. It also provides bearer channel activation/deactivation process and selection of the serving gateway (SGW) 135 for the mobile devices (in general, devices 117A, 117B, 117C and 110).

The MME 137 also authenticates the end user devices 151-154 of the WAP devices 117A-C by interacting with the Home Subscriber Server (HSS) 194. Alternatively, the MME 137 contacts and provides the respective end user device 151-154 and WAP device 117A-C authentication information to the service provider mobile broadband configuration server(s) 160. In response the service provider configuration server(s) 160 contacts the HSS 194 and performs the authentication of the respective end user device and the respective WAP device 117A-C.

The EPC 131 is provided by the cellular communication service provider (i.e., a mobile communication network operator (MNO)) and facilitates the exchange of data packets containing voice and data communications. In an example, the LTE network 111, the EPC network 131 and the IMS core 190 are provided by a cellular communication provider (i.e., MNO). An EPC network may include nodes and functions that provide Internet Protocol (IP) connectivity to and from one or more LTE networks 111 and the UE 110, for data, voice, and multimedia services. The EPC network 131 utilizes packet switching for packet transport, although for convenience, switches and/or routers for handling the flow of packets through the EPC network 131 are omitted. When a UE registers with the EPC network 131 through an attach procedure, information about the UE 110 is stored in a MME device 137. Thus, a MME device 137 in the EPC network 131 includes a database that stores information about UEs including UE 110.

As shown in FIG. 1, EPC network 131 connects UE 110 to one or more external IP networks 180. The EPC network 131 may connect to other networks, such as the public switched telephone networks, although such other connections are omitted for ease of illustration. The EPC network 131 typically include one or more devices that implement logical entities interconnected via standardized interfaces, and that provide wireless packet-switched services and wireless IP connectivity through the LTE network 111 to UE 110 for both data and voice services. The EPC network 131 may allow the delivery of broadband IP services and may interface with external IP network 180 for application services offered or controlled by the carrier (e.g., from application servers 187) or other service provider operating the overall mobile service network (including networks 111 and 131). In some examples, the cellular service provider network, or mobile communication network, includes the LTE network 111, the EPC network 131 and the IMS core 190. Of course, components of each of networks 111, 131 and 190 may be incorporated into the other to omit or augment functionality in one network or another.

The MME device 137 implements, among other functions, control plane processing for EPC network 131 for management of the mobility of mobile WAP devices such as 117 roaming amongst cellular service areas covered by one or more LTE radio access networks 111. For example, MME device 137 implements tracking and paging procedures for mobile WAP device 117, activates and deactivates bearers through networks 111, 131 for UE 110, authenticates a user of WAP device 117, and may interface to non-LTE radio access networks. The MME device 137 also selects a particular SGW 135 to service a communication session for a particular WAP device 117A-C.

The MME 137 sends and receives information associated with mobile WAP devices, such as 117. For example, the eNB 113 may be a servicing, or source, base station that provides cellular communications to the mobile WAP devices 117A-C.

The Packet Data Network (PDN) Gateway (PGW) 133 provides connectivity from the UE 110 and WAP devices 117A-C to external packet data networks. It is a point of exit and entry of traffic for the UE 110 and WAP device 117. The PGW server 133 monitors how much data is used by respective WAP devices 117A, 117B, 117C and UE 110.

For example, the MME device 137 may communicate with SGW 135. The MME creates and manages a new session for a particular UE 110. The MME device 130 communicates with the SGW 135 for various purposes, such as when the particular UE 110 attaches to EPC network 131, when bearers need to be added or modified for an existing session for the particular UE 110, or when a connection to a new packet data network (PDN) gateway (PGW) 139 needs to be created. While the control functions are managed by the MME 137, the actual delivery of the data communications is handled by the SGW 135 of the EPC 131.

The Serving Gateway (SGW) 135 routes and forwards data packets to the mobile WAP devices 117A and 117B through the MME 137. For example, a data packet can include a file retrieved from an enterprise server 117. The SGW 135 manages and stores mobile device parameters of the IP bearer channel service, including network internal routing information. For example, the SGW 135 provides via the PGW 133 a data pathway to and from UE 110, WAP devices 117A and 117B that handles forwarding of data packets for end user devices 151-154.

The Home Subscriber Server (HSS) 194 is a central database that contains user-related and subscription-related information. The HSS 194 provides features such as mobility management, call and session establishment support, user authentication and access authorization. For example, the HSS 194 stores the Mobile Station International Subscriber Directory Number (MSISDN), mobile device number (MDN), the universal integrated circuit card (UICC)-card identification information, and the like.

The above described network environment 100 is an example of an implementation of the mobile WAP devices 117A-C. The following is a more detailed description of the operation and configuration management of the respective mobile WAP devices 117A-C as well as a discussion of examples of additional security features applicable to end user devices, such as 151-154. Although the following discussion may specifically reference only one of the WAP devices 117A-C, the discussion is equally applicable to any of WAP devices 117A-C.

Figure 2:
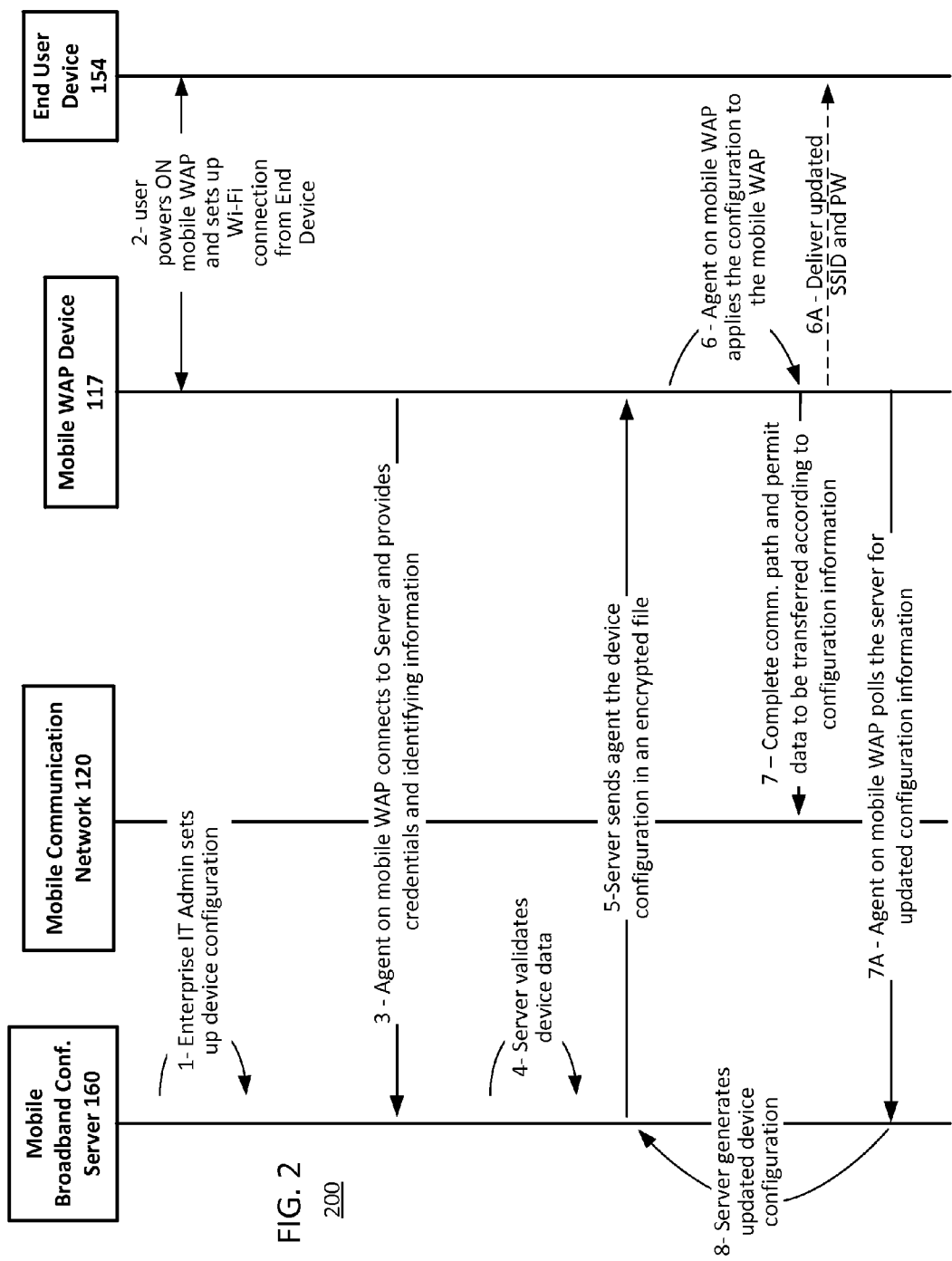
FIG. 2 illustrates an example of an intelligent mobile wireless access point (WAP) configuration management data flow in a system of mobile and data communication networks.

FIG. 2 illustrates an example of an intelligent mobile wireless access point (WAP) data flow in a system. The system 200 includes the intelligent mobile WAP device 117 (hereinafter, referred to only as "WAP device 117"), a wireless mobile (i.e. cellular) communication network 120 (including one or more of LTE RAN 111, EPC 131 and/or IMS core 190), and a mobile broadband configuration server 160. In an example, the WAP device 117 is provided by the service provider (i.e., MNO) that provides and supports the wireless mobile communication network 120. In another example, the WAP device 117 may be provided by a third party vendor that includes hardware, software and functionality that is compatible with the mobile broadband configuration server 160.

At a high level, the mobile WAP device 117 includes at least a short-range, local area wireless communication transceiver, such as Bluetooth (which includes Bluetooth low energy (BLE)) transceiver or Wi-Fi transceiver, a wireless mobile communication (i.e., cellular) transceiver, a processor, a universal integrated circuit card (UICC) interface, a USB port, and a memory. The configuration of the mobile WAP device 117 will be described in more detail below with reference to FIG. 3.

In operation at a high level of description, the mobile WAP device 117 communicates with end user devices, such as 154, via the short range, local area (e.g., Wi-Fi or Bluetooth wireless communication transceiver, and provides local wireless communications connectivity to a data communication network by transmitting data received from the end user device via the short range, local area transceiver through a connection established with the mobile communication network. The mobile communication network completes the connection to the data communication network through a connection with a data communication network, such as the Internet.

As shown in FIG. 2, the data flow in the system 200 includes the mobile broadband configuration server 160 located in or connected to a wireless mobile communication network 120. In some examples, the connection of the mobile broadband configuration server 160 with the wireless mobile communication network is through a data network of the wireless mobile communication service provider (i.e., MNO). In the example, the wireless mobile communication service provider is a cellular communication provider of mobile wireless communications. In other examples, the mobile broadband configuration server 160 is connected directly to the wireless mobile communication network 120 and supports the WAP device configuration management service provided by the wireless mobile communication service provider. The wireless mobile communication network 120 connected to a data communication network 180, such as the Internet. The mobile broadband configuration server 160 is accessible by the WAP device 117 via a wireless mobile communication network of the cellular provider that supplied the WAP device 117. The wireless mobile communication network is configured to connect the WAP device 117 to the Internet. Subsequently, an end point device connects to the mobile hotspot to receive access to the data network.

A purpose of the intelligent mobile WAP device 117 is to provide end point devices with connectivity to a respective data communication network, whether for business reasons or personal reasons. The following examples relate to enhanced business enterprise examples as the improvements, benefits and advantages explained herein, in terms of security, device and system configurability and management, not only apply to the mobile wireless access point devices and end user devices but also to the system for managing such wireless access point devices by a mobile communication network provider. However, such improvements, benefits and advantages are also available in personal use cases as well as other use cases, such as educational, emergency service and the like.

One or more of the WAP device 117 improvements described in the examples is provided by the execution of software by a processor on the WAP device 117. The software is described as an agent of the service provider. In other words, the software agent is a service-provider computer program installed on the WAP device 117 that provides the examples of security and configuration management functions described in the specification. Different versions of the software agent may be provided for installation on end user devices. For example, the software agent installed on the WAP device 117 includes security functionality and configuration management functionality that, while similar, is different than functionality provided by a service-provider software agent executing on the end user device 154. As an example, the WAP device 117 software agent is responsive directly to commands from the enterprise IT administrator, while the end user device 154 agent is responsive to the WAP device 117 software agent, or the end user device 154 agent indirectly responds to the mobile broadband configuration server 160 based on configuration file settings received by the WAP device 117 that may be shared with the end user device 154 agent. Additional examples that follow will further illustrate the functionality and capabilities of the software agents that execute on the configuration server, 160, the WAP device 117 and the respective end user devices 154. Note that the software agent may also be implemented in firmware, or combination of firmware and software (or, simply, "agent").

All WAP devices 117, when initially provided to an enterprise, are configured with original equipment manufacturer (OEM) configuration parameter settings. For example, the configuration parameter settings will have default values set, which are configurable by the enterprise IT administrator for customized use within the enterprise. All configuration parameter settings made by the enterprise IT administrator, or any other user for that matter, may be reset by anyone by interacting with a reset interface, typically a pushbutton, on the WAP device 117. A following example describes functionality for configuring a large (e.g., hundreds or greater) or small number (e.g., individual ones or tens) of intelligent mobile WAP devices 117 in mass at substantially the same time prior to deployment to a number of remote employees (i.e. teleworkers). For example, with reference to FIG. 2 at Step 1, a customer IT administrator (i.e., 175 in FIG. 1) of a business enterprise logs in to the enterprise servers, such as 187 in FIG. 1, the mobile broadband configuration server 160 via an enterprise (i.e. customer or subscriber) administrator computer device. After logging on and being authenticated by the enterprise server and/or the configuration server 160, the enterprise administrator is provided by the configuration server 160 with a graphical user interface that facilitates setting the configuration of the WAP device 117 and storing the configuration settings in data storage accessible by the configuration server 160. The configuration server 160 graphical user interface (UI) permits the enterprise administrator to set the configuration for multiple WAP devices 117 at one time. For example, the enterprise administrator may select through the UI a configuration parameter setting in the user interface to apply the configuration settings to all of the business enterprise's WAP devices 117, or to just select ones of the business enterprise WAP devices 117. For example, only certain WAP devices 117 will have particular configuration parameter settings changed, such as only those WAP devices on the East coast of the US, in the engineering department, provided to enterprise executives or the like. Examples of configuration parameters include the number of users of the WAP device (e.g., 1, 10 or 15), addresses of websites (e.g., uniform resource locator (URL)) permitted to be accessed or prohibited from being accessed or both; a duration (e.g., months, days, hours, minutes) that a connection to the wide-area mobile communication network will be maintained; configuration file update frequency, which enterprise account(s) to be billed, guest permission (e.g., whether guests (i.e., non-enterprise users or enterprise users of a different business unit of the enterprise (e.g. accounting versus engineering)) are permitted to obtain access to the wide-area mobile communication network; an amount of data usage permitted in a time period; details regarding WAP device identifying information to be broadcast or displayed (e.g., whether the WAP device's a security set identifier (SSID) is to be broadcast for detection by end user devices or hidden and only be presented as a hidden network to end user devices and the like); service diversion when multiple enterprise WAP devices are in use; and/or additional permissions and security or functional measures or any combination of the foregoing. Of course the aforementioned parameters are automatable whereby a single or combined set of events (based on geography, time or connection) will drive a single or combined action (i.e., notification, service diversion, et al.). In an example of a retailer, only the retailers and retailer partners' websites may be accessible, or in another example, a professional sports event may only permit users to access the professional sports league website, or a sponsor website or the like. Details of the configuration process and the functions that are configurable by the enterprise administrator will be discussed in more detail with reference to specific examples after the discussion of general elements of FIG. 2.

In another example, when an end user device 154 initially connects to a WAP device 117, credentials for both the end device user 154 and the WAP device 117 are delivered to the configuration server 160. In other words, not only is the mobile device number (MDN), international mobile equipment identifier (IMEI), or any other identifier, such as a user name, password, or the like of the WAP device 117 provided to the configuration server 160, but so are security credentials (e.g., the user name and password or the MAC address used to log into the end user device 154) related to the end user device 154 provided to the configuration server 160. For example, upon a user's successful login into the end user device 154, credential information regarding the end user device 154 is transmitted to the WAP device 117 processor. The transmitted credential information includes, for example, one or more of an indication of the user's successful log into the end user device (such as a flag, message or the like), a security key associated with the user, user name associated with end user device, user password associated with the end user device 154, a serial number of the end user device, an enterprise-assigned identifier of the user or an enterprise-assigned identifier of the end user device. The transmitted credential information, for example, is sent by an agent executing on the end user device 154 to the WAP device 117. Or alternatively, the agent functionality may be built into firmware executing on the WAP device 117 to insure that the software cannot be accessed and manipulated by an unauthorized user (i.e., the firmware cannot be as easily hacked as software). Of course, the agent functionality can be a combination of software and firmware.

Still referring to Step 1 of FIG. 2, after the enterprise administrator configures the WAP device 117, the WAP device 117 is deployed for use to the enterprise's employee users. Note that one or more employee users may use the same WAP device 117 to obtain data connectivity via the one or more enterprise users' end devices. For example, the WAP device 117 is deployed in an office space and multiple enterprise employee users (and, perhaps, guests) may connect to the WAP device 117 to obtain data services. However, for ease of discussion, a single end user device is presently discussed, but examples employing multiple end user devices will be interspersed in the Detailed Description.

In an example, after the enterprise user obtains the WAP device 117, at Step 2, the user powers ON the WAP device 117. Note while a user device interaction with a single WAP device is described, it is envisioned that the user device may have access to multiple WAP devices provided by the mobile communication operator.

In addition, the user turns ON her end user device (e.g., computer, tablet or laptop) 154 to connect, via a local area wireless connection (e.g., Wi-Fi or Bluetooth), her end user device 154 to the WAP device 117 for local wireless communications. The enterprise user through a user interface on the end user device 154 sets up a short-range, local area wireless communication (i.e., Wi-Fi or Bluetooth) connection between the end user device (in this example, a computer) and the WAP device 117. For example, so that the enterprise user's end user device 154 can connect to the WAP device 117, a WAP device 117 SSID and password are provided to the enterprise user by the enterprise IT administrator, and/or provided by a decal affixed to WAP device 117, or presented on a user interface (UI) display of the WAP device 117. In another example, instead of the user turning the WAP device ON, the mobile broadband configuration server 160 sends a SMS message to the device as a wakeup call instructing the device to periodically, such as every 12 hours, 24 hours or the like, check in with the mobile broadband configuration server for an updated configuration file.

In another example, an agent executing on the end user device 154 has credentials related to the end user device 154. When attempting to establish the local area connection with the WAP device 117, the end user device 154, in addition to providing the SSID and password, also provides end user device credentials, such as a security key or other authentication information. The WAP device 117 in addition to the SSID and the password may determine the validity of the end user device credentials. Upon successful validation of the SSID, password and the end user credentials, a local area connection is permitted to be completed between the WAP device 117 and the end user device 154.

Concurrently, or in response to the successful connection of the end user device 154 to the WAP device 117 at Step 2, the WAP device 117, at Step 3, checks in with the mobile broadband configuration server 160 at a frequency as determined by the IT Administrator, by establishing a connection with the mobile communication network 120 via a mobile wide area communication network transceiver within the WAP device 117. The WAP agent (not shown, but discussed with respect to subsequent figures) executing on the WAP device 154 provides information (e.g., security credentials) about the WAP device 117 to the mobile broadband configuration server 160. The WAP device 117 credential information is sent, for example in a JavaScript Object Notation (JSON) format. Of course, other secure message formats may be used. The credential information is encrypted by an agent (or firmware) executing on the WAP device 117 before being sent to the mobile broadband configuration server 160. For example, an initial encryption key (i.e., security key) is encoded on the WAP device 117, and the mobile broadband configuration server 160 knows the initial key. Upon a first connection to the server, a new key is downloaded to the WAP device 117. From then on all communication is performed using the new encryption key. In the case of a factory reset by a user, the new encryption key is maintained in the device, and the mobile broadband configuration server 160 is able to continue to communicate with the WAP device using the new encryption key. The mobile broadband configuration server 160 decrypts the WAP device 117 credential information and proceeds, at step 4, to attempt to validate the credential information by, for example, comparing the credential information to databases, performing validation processes, such as hashing and/or decryption, and the like. For example, the configuration server 160 checks with the mobile communication network subscriber servers (such as the HSS 194 in FIG. 1) to confirm that the WAP device 117 is a valid subscriber device. Using the MDN, IMEI and other numbers, the configuration server 160 is able to identify that the WAP device 117 belongs to an enterprise that is a subscriber of the mobile communication network. Upon a successful authentication/validation of the WAP device 117, the configuration server 160 retrieves from data storage a configuration file containing information that includes a policy (e.g., permission or preferences established for the WAP device 117 by the enterprise IT administrator as discussed above). Of course, the configuration server 160 performs a validation process using known validation procedures.

If the mobile broadband configuration server 160 validation is successful, a WAP device configuration file available for the WAP device 117 is sent by the mobile broadband configuration server 160 to the WAP device 117 agent in a secure message. For example, the secure message is in a JavaScript Object Notation (JSON) format. In an example, the WAP device configuration file is encrypted by the mobile broadband configuration server 160 before being sent to the WAP device 117 agent. The WAP device 117 agent is provided the appropriate security keys needed to decrypt the configuration file prior to the delivery of the configuration file by the mobile broadband configuration server 160. For example, the appropriate security keys may be delivered to the WAP device 117 agent upon completion of the authentication/validation process, at the time of deployment by the enterprise IT administrator, or at time of manufacture by the OEM.

The WAP device 117 agent also performs a validation of the configuration file provided by the mobile broadband configuration server 160. The mobile broadband configuration server 160 provides encrypted credential information (e.g., a security key, a device name, or the like) with the WAP device 117 configuration file. For example, a manufacturer of the WAP device 117, such as the original equipment manufacturer (OEM) of the WAP device 117, builds a default encryption key (e.g., $K_0$) into the WAP device 117 firmware. Key $K_0$ is saved in the WAP device 117 memory. The encryption key $K_0$ is generated using, for example, a 256-bit AES encryption algorithm. The WAP device 117 receives a short messaging service (SMS) message from the mobile broadband configuration server 160 to begin the check-in process, the SMS message includes a new encryption key ($K_1$). The WAP device 117 uses key $K_0$ to decrypt the SMS message and accept the new encryption key $K_1$. All subsequent communication with the mobile broadband configuration server 160 uses the new encryption key $K_1$ unless the mobile broadband configuration server 160 makes subsequent changes to the encryption process by using any subsequent, new keys (say $K_n$). For example, if the user performs a factory reset, the latest available encryption key $K_n$ is saved in the WAP device 117 memory. When the WAP device 117 powers up after the factory reset, the WAP device 117 uses encryption key $K_n$ to check in with the mobile broadband configuration server 160. In this manner, all communication between the mobile broadband configuration server 160 and the WAP device 117 is always encrypted. The mobile broadband configuration server 160 encrypted credential information is provided, for example, to insure the WAP device 117 is not being spoofed by unauthorized users or a rogue enterprise. In an example, the WAP device 117 configuration file is not accessible via a wired connection. As a result, the configuration file is delivered wirelessly, and even if an unauthorized user intercepts the delivered configuration file the combination of both the credential information and the encryption of the credential information makes the ultimate decryption of the configuration file more difficult. The WAP device 117 performs a validation process, similar to the validation process performed by the mobile broadband configuration server 160, to validate the credential information of the mobile broadband configuration server 160. If the validation is unsuccessful, the WAP device 160 may request that the mobile broadband configuration server 160 resend the configuration file and/or may generate an error message to the enterprise IT administrator (or present a message or indication on the WAP device 154 user interface, if available) indicating another validation is required. However, upon a successful validation, the WAP device 117 agent (or firmware) applies, at step 6, the configuration file parameter settings in the WAP device 117 configuration file to the WAP device 117. In other words, the WAP device 117 agent executing on a WAP device 117 processor adjusts configuration settings of the WAP device 117 based on the configuration information received from the mobile broadband configuration server 160.

At step 7, the end user device 154 is connected to the WAP device 117 via a short range transceiver. The WAP device 117, via a mobile wide area communication network transceiver, then completes set up of a communication path between the end user device 154 and the mobile wide area communication network 120. The WAP device 117 permits data to be transmitted between the mobile wide area communication network and the connected end user device 154 via the completed communication path.

From this point onwards, the WAP device 117 serves as a wireless access point for any end user devices 154 that connect to it, and the WAP device 117 operates according to the configuration file parameter settings provided by the mobile broadband configuration server 160. In a case where the user performs a factory reset by interacting with a reset interface (e.g., a button) on the WAP device 117, instead of reconfiguring to the default OEM configuration parameter settings as in prior systems, the WAP device 117 agent immediately checks in with the mobile broadband configuration server 160 and downloads the current WAP device configuration file available to the mobile broadband configuration server 160. As a result, the factory reset of the WAP device 117 merely delays set up of the connection to the data communication network, and has no effect on the configuration parameter settings.

At step 7A, the WAP device 117 agent checks-in with the mobile broadband configuration server 160 periodically at a frequency set by the mobile broadband configuration server 160 (or manually by the customer enterprise IT administrator) to receive any updates to the WAP device 117 configuration file. For example, based on a change in the data usage limits for the enterprise subscription account, the enterprise IT administrator through the mobile broadband configuration server 160 UI may change a parameter setting that increases or decreases the amount of data that may be used by the respective WAP devices 117. This parameter setting may be incorporated into the configuration file stored in data storage, and subsequently downloaded at a next update cycle of the respective WAP device 117. As mentioned above, the WAP device 117 may be configured with a default check-in period, such as 24 hours. In other examples, instead of periodic check-ins, the WAP device 117, for example, checks-in upon occurrence of an event, such as a number of hours that the WAP device 117 is used, when a new or specific end user device connects to the WAP device 117, upon reaching a threshold setting for data usage, upon detection of a change in geographical location of the WAP device 117, or the like. However, in certain instances, the IT administrator or the mobile broadband configuration server 160 may force a check-in via SMS. The portal sends a SMS message to the WAP device 117 instructing to the WAP device 117 to check-in with the portal provided by the configuration server 160 as soon as possible. An example of a certain instance may be the assignment of an emergency configuration change that the IT administrator wants to take effect immediately on the WAP device 117.

In an example, the IT administrator is able to select a setting that, as a security measure, prohibits the SSID and password from being reset by the enterprise end user, even if the end user performs a factory reset of the WAP device 117 the SSID and password are not reset. Alternatively, the end user has the ability to change the SSID and password if the IT administrator permits it by making the appropriate configuration parameter setting. In some examples, the SSID and password are always displayed on the WAP device 117 UI and thus are always known to the end user. Note that through the configuration file parameter settings, the IT administrator has the ability to lock or hide any of the parameter settings from being displayed to an end user, if the IT administrator chooses to do so. This way even if the end user logs into a local web UI console executing on the WAP device 117, the end user is only able to view the parameter settings but not modify them. If certain parameter settings are hidden from the end user, obviously the end user will not see the hidden parameter settings in the device local web UI. In response to the WAP device 117 checking in with the mobile broadband configuration server 160, the mobile broadband configuration server 160, at Step 8, may update the configuration file and/or perform a change to the SSID and password for use with the WAP device 117. Any changes to the configuration of the WAP device 117 are provided to the WAP device 117 by sending, by repeating the steps of Step 5, the updated configuration information to the WAP device 117 in an encrypted file. If the updated configuration information is the updated SSID and password for WAP device 117, the WAP device 117 provides this information to the end user device 154. At a subsequent connection request by the end user device 154 to the WAP device 117, the end user device 154 uses the updated SSID and password to connect to the WAP device 117. In addition, the WAP device 117 does not have to publish the SSID and/or password on a UI or broadcast an SSID (the network can remain hidden) in order to be detected by the end user device for connection. In an example, the parameter settings regarding administrator access to the WAP device 117 may also be configured by an IT administrator. For example, while the SSID and password are displayed on the WAP device 117 UI, the IT administrator is able to change and/or hide the administrator login and password input windows so an end user cannot log into the IT administration page.

In an example, user end user devices 154 have credentials that allow each end user device 154 to be a known quantity to the WAP device 117. In another example, a WAP device 117 allows an unknown end user device to attach to the WAP device 117 for a brief period (e.g., a user grace period, such as 15 minutes) during which access to the data communication network is available to allow the unknown end user device to establish a connection to the mobile broadband configuration server 160 in order to provide validating information. Once the mobile broadband configuration server 160 validates the unknown end user device, the end user device is able to access and use the WAP device 117. This is an example of a dynamic configuration of the WAP device 117.

For example, an employee and the employee's supervisor may be on a business trip. The supervisor may have forgotten her WAP device, but the employee may have brought his WAP device. However, the configuration of the employee's WAP device may not be configured to have a second user. The supervisor may access the WAP device and according to the dynamic configuration implementation, the supervisor's end user device is an unknown end user device to the WAP device. With the grace period as explained above, the supervisor is able to access the mobile broadband configuration server, and validate the supervisor's end user device. Upon successful validation, the mobile broadband configuration server may download a WAP device configuration that corresponds to the supervisor's WAP device configuration. For example, the supervisor's WAP device configuration may allow roaming, while the employee's WAP device configuration may not permit roaming. In order to permit both the supervisor and the employee to use the employee's WAP device and not allow the employee to have the same permissions and privileges (such as the above mentioned roaming capabilities), the configuration parameter settings of the employee's WAP device may updated with another configuration file provided by the mobile broadband configuration server 160 to accommodate use of the employee's WAP device by the supervisor. However, the other configuration file may include parameter settings that are specific to the respective end user devices. In other words, the another WAP device 117 configuration file parameter settings are such that the WAP device 117 differentiates between the employee's end user device requests and the supervisor's end user device requests. As a result, the WAP device 117 uses the employee's WAP device configuration settings when responding to request from the employee end user device, while the supervisor's WAP device configuration settings are used only in response to the supervisor's end user device.

For example, in configurations where the end user device 154 is equipped with a WAP device management agent application, the agent application executing on the end user device 154 causes, at an initial log in, the presentation of a log in window on the end user device 154 user interface. The log in window includes fields for the user to enter the SSID and password in order for the end user device to connect to the WAP device 117, and begin the mobile broadband configuration server 160—WAP device 117 validation process. The WAP device management agent application on the end user device 154 maintains the SSID and password in memory of the WAP device 117 so in the future, the end user device 154 is able to automatically connect with the WAP device 117. This feature may be manipulated by the mobile broadband configuration server 160 to provide an extra security feature.

In an example, the enterprise IT administrator through the mobile broadband configuration server 160 portal UI is able to configure the respective WAP devices 117 to permit only allowed end user devices to access the WAP device 117. In one implementation, this security feature is implemented by using a configuration parameter setting that places the media access control (MAC) address in an allowed user list. The UI allows enterprise IT administrator to make the configuration settings in which either the WAP device 117 or the mobile broadband configuration server 160 performs the determination of whether the MAC address of the end user device 154 is included in an allowed user list. For example, the allowed user list is included with the configuration file provided by the mobile broadband configuration server 160 to the WAP device 117 at Step 5 of FIG. 2.

In an example, the WAP device 117 is configurable for both personal and business uses. An enterprise user of the WAP device 117 may also have a personal mobile communication network subscriber account with the mobile communication network service provider that provides data communication services to the enterprise and the WAP device 117. The WAP device 117, when both the enterprise and the user are subscribers of mobile communication network services, is able to be configured to allow either business use or personal use. Since the user is both an enterprise subscriber and a personal subscriber, the WAP device 117 is configured to facilitate the charging of the correct subscriber account based on an indication of whether personal service or business service is being provided through the WAP device 117. In order to differentiate between the two different subscriber accounts (i.e., the enterprise business subscriber account and the personal subscriber account), the WAP device 117 is configured to determine when the user wishes to switch from the business use to a personal use, or vice versa. For example, the enterprise IT administrator sets the configuration parameter settings in the configuration file for the particular WAP device 117 to permit both business use and personal use. The configuration parameter settings include settings to present on a UI of the particular WAP device 117 a touch switch control input that is capable of receiving an input (e.g., a swipe gesture, or a touch) from the user indicating whether the use is to be enterprise use or business use. In this case, the particular WAP device 117 is configured with two different user account credentials (one for the enterprise and the other for the personal account of the user). In response to the input, an agent executing on the WAP device 117 interprets the user input and determines the indicated use as either personal use or business use, and selects, based on the user input, the correct account credentials for connecting to the mobile broadband configuration server 160.

In another example that allows the agent executing on the WAP device 117 to determine the type of use as either business or personal, when initially connecting to the WAP device 117 the user may launch an application on the end user device 154 that provides an enterprise-related function, for example, a virtual desktop of the enterprise or the like. The end user device 154 may provide a URL for accessing an enterprise-related device, such as server or data storage, to the WAP device 117. In response to receiving the URL of the enterprise-related device, the agent executing on the WAP device 117 provides enterprise subscriber credentials to the mobile broadband configuration server 160 instead of the user's personal subscriber credentials. Conversely, the WAP device 117 agent receives a URL of a search engine that is not associated with an enterprise use. In response, the agent executing on the WAP device 117 provides personal user subscriber credentials to the mobile broadband configuration server 160 instead of the user's enterprise subscriber credentials. The respective credentials may be obtained from a memory of the WAP device 117.

In addition to setting the account being charged for providing the service to the WAP device 117 to either the enterprise subscriber account or the user's personal subscriber account, other settings of the WAP device 117 are also configurable based on whether the use is enterprise use or personal use. For example, in response to detecting the user input indicating a business use and receiving a configuration file from the mobile broadband configuration server 160, the agent executing on the WAP device 117 accesses the configuration file provided by the mobile broadband configuration server 160 and sets the data usage limits, time limits, permitted/prohibited website settings, permissible end user device settings, and the like, according to the configuration parameter settings indicated in the configuration file for the business enterprise user. In addition or alternatively, in the case of an enterprise end user using the WAP device 117, the WAP device 117 may be configured to disconnect (i.e., drop) a data connection in response to a virtual private network connection not being established within a certain time period. For example, the certain period of time can be set to start from the establishment of the initial connection between the end user device 154 and the WAP device 117 and may last for 10 or 15 minutes. In another example, the certain period of time may start from the initial power up of the WAP device 117. In addition or alternatively, the WAP device 117 may be configured with a settable limit for the number of times, such as 3 or 4, that the WAP device 117 is permitted to be turned ON without establishing a connection to a virtual private network. The IT administrator can set these features in the configuration file and also assist an users having difficulty with complying with the settings. The WAP device 117 is accordingly improved by allowing both a non-enterprise use and an enterprise use by a WAP device 117 user because the WAP device allows for appropriate configuration file management and subscriber billing.

As mentioned above, the preceding examples were described with reference to a single WAP device 117. However, it is envisioned that several WAP devices 117 are deployable to provide a larger data network access area for an enterprise by locating a plurality of WAP devices in a predefined area. For example, data communication services can be provided to a large area (e.g., a park, an outdoor gathering (e.g., festival) or the like) or venue (e.g., a convention center, a sports venue, an educational facility, and the like). The foregoing examples may be scaled to multiple WAP devices, and the following examples are but a few use cases for multiple WAP devices.

In the case of multiple WAP devices being used as a data communication network (such as network 180 of FIG. 1), the process illustrated in FIG. 2 is performed for each WAP device 117 of the multiple WAP devices. So when each WAP device 117 is powered ON, after the appropriate authentication/validation handshaking as shown in FIG. 2 is performed, end user devices, such as 151-154 of FIG. 1, may begin to connect to the data communication network. Depending on the use case, the end user credentials may not be used to authenticate/validate the end user device as an authorized user. For example, if the multiple WAP devices are deployed for use by the general public, then all devices are allowed access. However, end user device credentials including end user device identifying information may be obtained to facilitate tracking for WAP device handover and data usage, time limit duration and the like. For example, end user device usage may be time limited to, say 30 minutes, which allows other users to access the WAP device and also serves as a means to limit data usage. Also, the amount of data usage can be limited for particular users, so one of the particular users does not cause a WAP device data usage limit (e.g., 1000 GB) to be exceeded. Thus, the WAP device may have a network-established data usage limit and individual end users may have independent data usage limits established by the WAP device. Also, as a user travels within a venue or area with her end user device (e.g., a smartphone that is using local area network instead of the mobile wide area communication network), the end user device detects stronger WAP device signals from WAP devices different than the WAP device to which the end user device is connected. In this case, the end user device attempts to connect to the WAP device with the stronger signal, and the end user device credentials may be needed to facilitate the handover from a current WAP device to a subsequent WAP device.

Each of the following examples illustrate improvements to a WAP device with respect to configuration management and device usage management. For example, configuration management improvements include updating the configuration of the WAP device based on data usage reports. And, examples of device usage management improvements include the capability to change allocations of data usage and the transfer of users from one WAP device to another. Other improvements will become apparent to the reader upon consideration of the entire specification, each of the claims and drawings.

In an example, suppose there are twenty (20) WAP devices deployed in an area, such as a football stadium. Each of the twenty WAP devices is configured to accommodate a limited number of end user devices, such as twenty end user devices. Each of the twenty WAP devices is configured based on the configuration file and base functionality provided by an agent executing on the WAP device to obtain information related to and manage the end user device use of the WAP device. Each of the twenty WAP devices, in an example, measures data usage (e.g., by maintaining a count of bits/bytes transferred through the WAP device), determines a location of the WAP device (via GPS, cell triangulation, and/or another method), determines the number of end user devices connected to the WAP device, obtains identifiers of end user devices accessing the WAP device, obtains an indication of types of end user devices that are connecting to the WAP device, and other information regarding the WAP device performance as well as obtaining other information regarding connected end user devices. The other information regarding the connected end user devices may be obtained directly from the end user devices. For example, a user name or end user device identifier may be provided at the time of log on to the WAP device. Alternatively, the WAP device may receive end user information from a server, such as an application server 187 that the end user accessed via the WAP device or from the mobile broadband configuration server 160 Of course, more or less information may be obtained regarding usage statistics and connected end user devices. In an example, each of the WAP devices provides a report of the measured of data usage, the location of the respective WAP device, identifiers of end user devices accessing the respective WAP device, an indication of types of end user devices (e.g., computer, smartphone, vending machine) that are connecting to the WAP device (if available), and the like.

Using, for example, the obtained information regarding the end user devices, suppose a high bandwidth end user device is identified. For example, the end user device identifier is associated with historical data accessible by the mobile broadband configuration server, and the historical data indicates that the end user device has historically used a large amount of data when connected to the data communication network via the mobile communication network. In other words, the end user device is a high data usage device. In order to avoid exceeding a data limit for the particular WAP device that is providing data service to the high data usage device, the mobile broadband configuration server via the configuration file or the WAP device firmware provides instructions to the WAP device on how to respond to the identified high data usage end user device. For example, in response to the identification of a high data usage end user device, the WAP device based on certain conditions related to the identified high data usage end user device dynamically adjust the number of users of the particular WAP device so as to maintain a positive experience and quality of service (QoS) for all of the users connected to the particular WAP device. For example, one of the certain conditions may be that the identified high data usage end user device is consuming too much of the bandwidth of the respective WAP device to which the high data usage end user device is connected. As a result, the user experience of other users whose end user devices are also connected to the respective WAP device is negatively impacted. Accordingly, the system, in the example, dynamically adjusts the number of end user devices connected to the respective WAP device by diverting service from the respective WAP devices to which high data usage end user device is connected to another WAP device of the twenty deployed WAP devices. For example, the respective WAP device may generate a report to the mobile broadband configuration server identifying a high data usage end user device as having connected to the WAP device. In response to identifying a high data usage end user device, the mobile broadband configuration server may take remedial action by determining if another mobile wireless access point device is in the vicinity of the WAP device presently connected to the end user device. Upon a determination that another WAP device is in the vicinity of the WAP device presently connected to the end user device, the mobile broad configuration server may forward instructions via the WAP device to the high data usage end user device to transfer connection to the other WAP device from the mobile wireless access point device. For example, the transfer from one WAP device to the other WAP device may be based on a measured amount of data usage of the mobile wireless access point device in the subscription period being within a predetermined threshold of a maximum amount of data usage. In such an example, the respective WAP devices being used may be configured to report their respective data usages to the mobile broadband configuration server. Based on the respective reports, the mobile broadband configuration server maintains a list of WAP devices including the respective measured amount of data usage, the respective data usage subscription period thresholds and the respective data usage subscription period limits. Each of the respective WAP devices may have different measured amounts of data usage, different data usage subscription period thresholds and different subscription period limits. In another example of a scenario in which multiple WAP devices are deployed, for example, in a trade show, the trade show sponsor is the enterprise owner of the WAP devices and may subscribe to a maximum aggregate daily data usage for all of the deployed WAP devices. For example, when twenty WAP devices are deployed, each of the WAP devices may be allocated $1/20^{th}$ of the maximum aggregate daily data usage. During the course of the day at the trade show, the mobile broadband configuration server is configured to modify, based on the measured data usage reported by the individual WAP devices, the maximum aggregate daily usage allocated to respective ones of the WAP devices. For example, a WAP device deployed at the entrance of the tradeshow may be using a minimal amount of its allocated data usage, while another WAP device further inside the tradeshow or near a popular venue is quickly approaching its allocated data usage (note that the two WAP devices are not close enough to transfer users from one to another), the mobile broadband configuration server is able to increase data usage allocated to the WAP device at the popular venue to, say $1/15^{th}$, of the allocated maximum aggregate daily usage, and reduce the WAP device near the entrance to $1/30^{th}$ or some other value, to permit the end users to continue to use the WAP device deployed to the popular venue. Of course, other use scenarios and examples are envisioned but for the sake of brevity not all are described.

In another example, if a particular WAP device of the twenty deployed WAP devices is approaching a data limit (e.g., 5000 MB), the number of connected end user devices can be reduced to minimize the likelihood of the data limit being exceeded. This likelihood may be determined, for example, by extrapolating a current data rate usage (e.g., 500 MB or 1 GB per hour) to the data limit (e.g., 5000 MB) and determining a remaining time until the end of the event or until the venue closes. Using the remaining time and the current amount of data used, the mobile broadband configuration server 160 can be configured to determine whether the data limit for the WAP device will likely be exceeded prior to the end of the event or closing of the venue. Of course, more complex methods of determining whether an end user device should be diverted from one WAP device to another or be precluded from accessing any WAP device may be used. For example, an aggregate data usage for all devices connected to twenty WAP devices and the total data usage can be used to determine the likelihood that a data limit will be exceeded.

In an example of aggregate data usage, when more than one end user device is connected to the mobile wireless access point device, the WAP device 117 is configured to measure an amount of data usage by measuring an amount of data passing through the WAP device 117. The amount of data passing through the WAP device 117 includes data received by the WAP device 117 from each of the end user devices and data transmitted from the WAP device 117 to the connected device and each of the more than one other end user devices connected to the mobile WAP device 117. Threshold data usage settings for each WAP device 117 may be set according to the WAP device 117 subscription, such as 1000 MB per some time period, like a week, month or even per day. The threshold data usage is a data usage setting below a permitted maximum data usage limit for the subscription period. The WAP device 117 is provided with the subscription period information, for example, with the configuration file or by the mobile broadband configuration server 160. The WAP device 117 compares the measured data usage to the threshold data usage for a subscription period. In response to a comparison result, the WAP device 117 determines a likelihood value that indicates a probability that the maximum data usage for the wireless access device will be exceeded within the subscription period and, in an example, reports the likelihood value to the configuration server.

In a particular example, in an area in which there are multiple WAP devices deployed and one of the plurality of WAP devices was approaching a limit (either time or data usage), users could be switched (i.e., handed off) to other WAP devices of the multiple deployed WAP devices. This can be accomplished by using the MAC address of the user(s) to identify those users switched from the WAP in question. In the case, for example, where the number of users on a WAP device is to be reduced from six (6) users to two (2) users. The MAC addresses of the four (4) users that will be disconnected are identified by the mobile broadband configuration server. For example, the four users that are the highest users of data of the six users or the four users of the six users that have been connected to the respective WAP device for the longest duration may be identified for transfer. Or, for example, the two users with the lowest data usage amounts of the six users may be identified to remain connected. In order to disconnect the four (4) users, the four users' access to the WAP device is terminated, and the number of permitted users of the WAP device (i.e., the WAP device user limit) is reduced to two (2) users. Once the device is limited to the two users and those two users are connected to the WAP device, the WAP device stops broadcasting its SSID. In response to being unable to connect to the WAP device, the other four users attempt to locate other WAP devices in the area for connectivity to a data communication network. A similar process could be used if a number of high data usage users connected to a single WAP device, one or more of the high data usage users could be switched to another WAP device in the plurality of WAP devices. For example, the WAP device with the lowest number of users or with the lowest data limit is determined to be the initial WAP device evaluated for connection of a high bandwidth (i.e., data usage) end user device. All of the control will be through the portal through to the mobile broadband configuration server which will leverage the mobile workforce manager (MWM) software and functionality. The policy or rules with events and conditions can be used to manage the use of the plurality of WAP devices to facilitate the most efficient use of bandwidth, QoS and overall user experience.

In another use case, an overlapping or mesh-like or distributed antenna network of a plurality of WAP devices at an event, such as a concert, a county fair, a blood drive and the like, may be pre-advertised to have users download via the mobile wide area communication network an application associated with the event to download content from an application server such as application servers 187 of FIG. 1. The downloaded application, for example, includes the log on credentials to the respective WAP devices. The end user devices use the downloaded log on credentials to connect to the WAP devices, and subsequently connect to the data communication network to access the data and content specific to the particular event.

Also envisioned is an example in which a few WAP devices are connected in a mesh network. However, some of the WAP devices in the mesh network may interfere with one another, which, for example, is determined based on a quality of service (QoS) measurement for each respective WAP devices in the mesh network. For example, a predetermined number of dropped or lost packets may indicate interference or some other indicator of diminished QoS may be determined and used as a basis for determining interference. In order to mitigate the potential for interference, a dynamic transmit power control is incorporated into the respective WAP devices of the mesh network. Under control of the mobile broadband configuration server, the transmit power settings of the respective WAP devices of the mesh network may be changed to minimize interference between the respective WAP devices.

Figure 3:
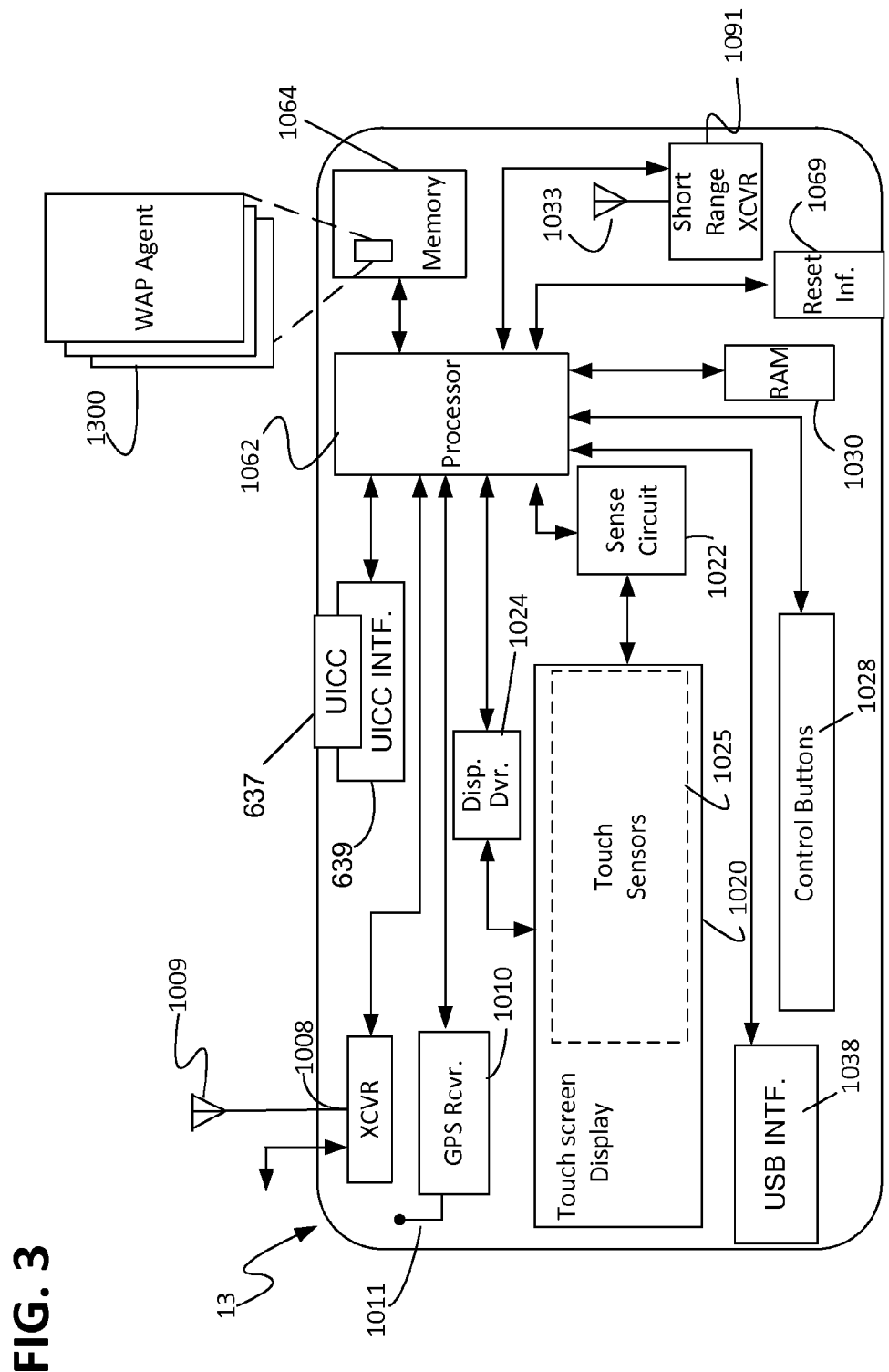
FIG. 3 is a simplified functional block diagram of an example of an intelligent mobile wireless access point device.

The above examples and others are envisioned and may be incorporated into the respective WAP devices and agents executing on the respective WAP devices. At this time, it may be useful to consider, at a high level, the functional elements/aspects of a WAP device in more detail. FIG. 3 illustrates an example of a WAP device configuration for implementing the described examples.

A WAP device, such as WAP device 13, is a portable device that acts as an access point to a mobile wide area communication network. Said differently, the WAP device 13 provides digital data communications to end user devices by connecting to the end user devices either wirelessly or via a wired connection. The configuration of a WAP device 13 is similar to that of a smart phone, but without the sophisticated user interface (UI). Generally, the WAP device 13 includes a transceiver so the WAP device can connect to a mobile communication network, another transceiver so an end user device can connect to the WAP device 13, a web client application so the end user device can connect to the mobile broadband configuration server portal (not shown) and may access with the correct permissions and settings for using the WAP device 13. Note that WAP device 13 is also configurable for installation in areas of a vehicle and different systems may or may not be replaced by systems utilized by the vehicle, such as a global positioning system or short range communication antennas and/or transceivers.

For digital wireless communications, the WAP device 13 includes at least one digital transceiver (XCVR) 1008. The WAP device 13 is configured for digital wireless communications using one or more of the common network technology types. In an example, the XCVR 1008 is configured as a mobile wide area communication network transceiver suitable data communications over a long term evolution (LTE) network or other mobile communication network, such as CDMA or the like. The concepts discussed here encompass embodiments of the WAP device 13 utilizing any digital transceivers that conform to current or future developed digital wireless communication standards. The WAP device 13 may also be capable of analog operation via a legacy network technology.

The transceiver 1008 provides two-way wireless communication of information, such as digital information for data communications (including for authentication), in accordance with the technology of the networks of FIG. 1. The transceiver 1008 also sends and receives a variety of signaling messages in support of the various data services provided via the WAP device 13 and the communication network. Each transceiver 1008 connects through RF send and receive amplifiers (not separately shown) to an antenna 1009. The WAP device 13 also includes a short range, local area transceiver 1091 and antenna 1033 that is configured to provide wireless connectivity to end user devices, such as 151-154 of FIG. 1, over a range shorter than the mobile wide area communication transceiver 1008. For example, the short-range, local area transceiver 1091 is configured to provide wireless communication according to the 802.11xx standard (i.e., Wi-Fi), the range of Bluetooth standards, such as Bluetooth Low Energy, or any other suitable short-range communication standard.

A microprocessor 1062 serves as a programmable host or controller for the WAP device 13, in that it controls all operations of the mobile device 13 in accordance with programming that it executes, for all normal operations, and for operations involved in the wireless access point mobile communication management and configuration setting service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 1062, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU or processor hardware in server computers or other user terminal computer equipment.

The microprocessor 1062 also, for example, executes programming or instructions to configure the WAP device 13 to perform various operations. For example, such operations may include various general operations (e.g., displaying status information, establishing a mobile wide area communication network connection, obtaining data from and about connected end user devices, and the like) of the WAP device 13 as well as operations related to confirming or adjusting operational or configuration parameter settings of the WAP device 13, contacting network devices, storing user preference information, controlling encoding/decoding of data signals and control signals, and the like. Although a processor may be configured by use of hardwired logic, typical processors in mobile devices are general processing circuits configured by execution of programming. The microprocessor 1062 connects to other elements of the WAP device 13 via appropriate circuitry, such as bus or terminal connections. In a present example, the WAP device 13 includes flash type program memory 1064, for storage of various "software" or "firmware" program routines such as device operating system (OS), data encoding/decoding algorithms, connected device related information, security key encoding/decoding algorithms, programs related to graphical user interface elements related to the touch-screen display 1020, and other WAP device 13 functions. The memory 1064 also stores WAP device configuration settings, such as the MDN, the IMEI and/or mobile identification number (MIN), configuration parameter settings, and other information for providing WAP device management and configuration control functions. The WAP device 13 may also include a non-volatile random access memory (RAM) 1033 for a working data processing memory. Of course, other storage devices or configurations may be added to or substituted for those in the example. The memories 1064, 1033 also store various data, such as data related to configuration settings, such as telephone numbers of devices permitted to connect to the WAP device 13 and server addresses, prohibited and permitted URLs, UI menu information, and various data input by the user. Programming stored in the flash type program memory 1064, sometimes referred to as "firmware," is loaded into and executed by the microprocessor 1062. For example, the WAP device agent code is stored in the memory 1064 as software, firmware or a combination of both.

As outlined above, the WAP device 13 includes a processor, and programming, such as the WAP device agent application(s) 1030, stored in the memory 1064 configures the processor so that the WAP device is capable of performing various desired functions, including in this case the functions involved in the technique for managing wireless access through and configuration of the WAP device 13. The logic implemented by the processor 1062 of the WAP device 13 configures the processor 1062 to control various functions as implemented by the WAP device 13. The logic for a processor 1062 may be implemented in a variety of ways, but in our example, the processor logic is implemented by programming for execution by the processor 1062. Regular operations of the device are controlled by operation of the processor 1062. WAP device configuration tables, data usage information (such as data usage thresholds), data usage historical statistics for end user devices and one or more applications 1300, such as an application for determining the likelihood that a particular end user device will cause the WAP device to exceed a data usage threshold, may be stored in flash memory 1064. In addition to the different applications, which are stored in memory 1064, a power management application may also be stored in the memory 1064.

The WAP device 13 includes a touch-screen display user interface (UI) 1020 for displaying status messages, menus or the like. Control buttons 1028 or a virtual keyboard presented via the touch-screen display 1020 may enable traversing different status indication screens, function selection menus (which are based on the configuration parameter settings) as well as generating selection inputs, for example, as may be keyed-in by the user based on a displayed menu or as a cursor control and selection of a highlighted item on a displayed screen of the touch screen display. However, the touch screen display UI on the WAP device is typically informational, and does not allow input of information. The WAP device touch screen display UI also is configurable. For example, the touch screen display UI can be configured to allow only high level employees to have access to all of the screens of the UI (e.g., a screen may provide the number of users and an identifier of the users of the WAP device) while a lower level employee would only see a screen with the SSID and password. In addition, when an end user device connects to the mobile broadband configuration server, the web client implemented by the execution of an agent on the end user device may be configured to limit the information that is presented via the end user device output devices to the user based on different criteria, such as section of a business or level within the business. For example, the enterprise IT Administrator may configure the WAP device to not display the GPS settings on the WAP device UI or may show the GPS setting but will not allow a user to make any settings to the GPS reporting settings.

The touch screen display 1020 and control buttons 1028 are the physical elements providing a textual or graphical user interface. Of course other user interface elements may be used, such as a trackball, as in some types of other user devices, PDAs or smart phones.

In addition to data communication related input/output, the user interface elements also may be used for display of menus and other information to the user and user input of selections, including any needed during user selection of a menu option. For example, if used as a selection device, the user interface elements allow a user to input information or make setting selections via, for example, interactions with the WAP device agent application, related to the user's usage of the WAP device. For example, the user interface elements may be used to allow a user to switch between personal use of the WAP device and a business use of the WAP device, or view statistics on data usage, the SSID and password, if presented, and the like.

For input purposes, touch screen display 1020 includes a plurality of touch sensors 1025. Other interface elements may include control buttons including one or more buttons 1028. For example, the keypad may be implemented in hardware as a T9 or QWERTY keyboard of WAP device 13 and control buttons 1028 may correspond to the physical keys of such a keyboard. Alternatively, control buttons 1028 of WAP device 13 may be implemented as "soft keys" of a virtual keyboard graphically represented in an appropriate arrangement via touch screen display 1020 for inputting information. The different user interface elements may be used to navigate through the examples of WAP device configuration management described herein.

For output, touch screen display 1020 is used to present information (e.g., text, video, graphics or other visible digital media content) to the user of WAP device 13. Processor 1062 controls visible display output on the LCD or other display element of the touch screen display 1020 via a display driver 1024, to present the various visible outputs to the device user.

In general, touch screen display 1020 and touch sensors 1025 (and one or more keys 1030, if included) are used to provide the textual and graphical user interface for the WAP device 13. In an example, touch screen display 1020 provides viewable content to the user at WAP device 13. Touch screen display 1020 also enables the user to interact directly with the viewable content provided in the content display area, typically by touching the surface of the screen with a finger or an implement such as a stylus.

The WAP device 13 includes a sense circuit 1022 coupled to touch sensors 1025 for detecting the occurrence and relative location/position of each touch with respect to a content display area of touch screen display 1020. In addition, the sense circuit 1022 is configured to provide processor 1062 with touch-position information based on user input received via touch sensors 1025 (e.g. a user interface element). In some implementations, processor 1062 is configured to correlate the touch position information to specific content being displayed within the content display area on touch screen display 1020. The touch-position information captured by sense circuit 1022 and provided to processor 1062 may include, but is not limited to, coordinates identifying the location of each detected touch with respect to the display area of touch screen display 1020 and a timestamp corresponding to each detected touch position.

As mentioned above, a user may perform a factory reset of the WAP device 13 configuration settings in an attempt to return the WAP device to a factory configuration set by the OEM. Also as mentioned above, an advantage of the presently described examples is that a factory configuration is not attainable when performing a factory reset. However, from time to time, a WAP device may need to be reset, for example, when the WAP device is returned by a user to the enterprise Admin 175 for reuse by another user, or in the case, that the software becomes unstable in response to some environmental condition or the like. The WAP device 13 has a reset interface 1069 which may be a concealed pushbutton or the like. The actuation of the reset interface 169 causes the WAP device 13 to perform steps substantially similar to Steps 2 and 3 of FIG. 2. For example, the WAP device 13 powers ON, and attempts to connect to the mobile broadband configuration server to retrieve a latest configuration file. Otherwise, the actuation of the WAP device 13 does not revert the WAP device 13 to a configuration file status that is different from that input by the enterprise IT administrator 175.

There are a variety of ways that a WAP device 13 may be configured to obtain information with respect to current location of the device. In our example, the WAP device 13 includes a global positioning satellite (GPS) receiver 1010 and associated antenna 1011. Location information, in some examples, may be used by the mobile broadband configuration server, such as server 160 of FIG. 1 in making determinations regarding configuration file settings for the WAP device 13. While the WAP device 13 includes GPS reporting functionality, the GPS functionality can be configured to allow a user to turn the GPS reporting ON/OFF.

Since the WAP device 13 has substantially all of the functionality of a mobile telephone, the WAP device 13 includes an interface for a UICC 637, the UICC interface 639 is configured to receive and maintain the security of the UICC 637. The UICC 637 includes identifiers usable by the WAP device to identify the WAP device to the mobile communication network and the mobile broadband configuration server. For example, the UICC 637 stores subscriber-related information, such as subscriber user name, subscriber account name, subscriber account numbers, an MDN, IMEI, WAP device configuration file parameters, network addresses for mobile communication networks, such as partners of the subscriber's home mobile communication network and other information (e.g., encryption/decryption algorithms) that may be used by the WAP device to perform the configuration management functions. The logic implemented by the processor 1062 of the WAP device 13 configures the processor 552 to control various functions as implemented by the WAP device 13. The logic for a processor may be implemented in a variety of ways, but in our example, the processor logic is implemented by programming for execution by the processor 1062.

In an example, when a user travels frequently for an enterprise and is required to access data networks when traveling, the capability to remove and replace the UICC 637 allows for the prioritization of cellular carriers. For example, the WAP device 13 can be configured to have configuration parameter setting that, in response to determining a location of the WAP device, may present on a menu of a graphical user interface on the touch-screen display 1020, which cellular service provider is providing the least expensive service provider for the given location. Based on this information, the user is able to switch the UICC 637 with a UICC compatible with the least expensive service provider. For example, the enterprise user is traveling in Germany and powers on the WAP device 13. Upon reaching the mobile broadband configuration server, the mobile broadband configuration server is able to identify from, for example, mobile communication network provided information (e.g., network identifier information) or GPS information that the WAP device is in Germany. In response to the location determination, the mobile broadband configuration server returns a message to the user interface that another cellular service provider (e.g., XYZ cellular provider) in Germany provides better rates than the cellular service provider currently being used. Alternatively, the message from the mobile broadband configuration server may a prioritized list of several cellular service providers in Germany and Europe (e.g., XYZ, ABEL, and C9 cellular service providers) that offer better rates than the cellular service provider currently being used by the WAP device. If the user has a UICC card suitable for use with any of the listed cellular service providers, the user can swap the UICC card 637 in UICC interface 639 of the WAP device 13 with a UICC card of one of the cellular service providers offering better rates. The message may be flashed on the UI of the WAP device. The WAP device has a USB interface 1038 for tethering (e.g., a wired connection) such as shown in FIG. 1 being used by end user device 153.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the configuration parameter setting service examples described herein. The software code is executable by the general-purpose computer that functions as WAP device processor. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for managing the configuration parameter settings, in essentially the manner performed in the implementations discussed and illustrated herein.

Another use case example is incorporation of the WAP device into a consumer vending device, such as a beverage machine, candy machine, snack machine or the like, or in any other device, to act as a data transmission mechanism that communicates via a mobile communication network. The WAP device can be used as a troubleshooting device should the vending device begin to fail, or to alert a management device of product shortages. The present WAP device examples prevent an unauthorized user from obtaining unauthorized use of the vending device WAP device to gain access to a data network by performing a factory reset of the WAP device configured for use in the consumer vending device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

More specifically, FIG. 4 illustrates a network or host computer platform, as may typically be used to implement a server, such as mobile broadband configuration server and/or any of the other servers/platforms implementing the enhanced WAP device configuration parameter setting and configuration management related functions shown in FIG. 1 or 2. A server, for example, includes a data communication interface for packet data communication. The server also includes a central processing unit (CPU), in the form of one or more processors, for executing program instructions. The server platform typically includes an internal communication bus, program storage, and data storage for various data files, such as WAP device configuration files, to be processed and/or communicated by the server, although the server often receives programming and data via network communications. In addition, the illustrated server includes one or more communication ports for connecting to servers and data stores within the server's network, but also in other networks, such as mobile communication network service provider's subscription data storage or other servers (e.g., the HSS 194 of FIG. 1). The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the WAP device configuration management and configuration parameter setting techniques discussed herein may be downloaded and/or updated from a computer platform, for example, to configure the mobile broadband configuration server or other server (as shown in FIG. 1 or 2) or from a host computer or the like communicating with the WAP device via the mobile communication network (as shown in FIG. 1 or 2).

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. An enterprise administrator user terminal, as shown, may include elements to those of the device shown in FIG. 9 and be coupled to a data communication network. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

In addition to a device for use by an enterprise administrator, the user terminal device of FIG. 5 may also represent one or more of the end user devices 151, 152 or 154 of FIG. 1. For such end user device usage, the read only memory (ROM) or data storage DS may store a WAP agent web client that facilitates the interaction of the end user device with the WAP device and the mobile broadband configuration server. For example, the WAP agent may execute the described updating of the SSID and password of the WAP device without generating a notification alerting the user of the change to the SSID and password of the WAP device.

Hence, aspects of the methods of exchanging security credentials and providing configuration files outlined above may be embodied in programming. Program aspects of the technology may be thought of as "products" or "articles of manufacture" typically in the form of executable code and/or associated data that is carried on or embodied in a type of machine readable medium. For example, the file format JSON was referred to above. JSON is a lightweight text-based open standard for human-readable data interchange. It is used for serializing and transmitting structured data over a network connection. It is used to transmit data between the mobile broadband configuration server and the WAP device as well as exchange data with the agent executing on the end user device, providing a more efficient alternative to HTML. Although JSON is used in the described examples, other formats, such as Extensible Markup Language (XML) can be used as a means of communication between the device layer and the application layer. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a mobile broadband configuration server (i.e., configuration server) or host computer of the WAP device service provider into the computer platform of the server that will be the mobile broadband configuration server, or into the WAP device or the software agent of the end user device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution. An example of such a non-transitory, computer or machine readable storage medium is an optical or magnetic disk.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the software agent security features, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a first wireless communication transceiver to communicate with an end user device;
   a second wireless communication transceiver to access a mobile wide area communication network;
   a memory to store credential information related to the device, configuration settings of the device, and information related to the end user device; and
   a processor, connected to the first wireless communication transceiver, the second wireless communication transceiver, and the memory, to:
      establish, using the second wireless communication transceiver, a first wireless connection between the device and the mobile wide area communication network;
      transmit, using the second wireless communication transceiver, information related to the device to a configuration server;
      receive, using the second wireless communication transceiver and based on transmitting information related to the device to the configuration server, a configuration file from the configuration server, the configuration file including operational rules related to use of the device by the end user device;
      adjust, based on the operational rules, the configuration settings of the device;
      establish, using the first wireless communication transceiver and based on the information related to the end user device, a second wireless connection with the end user device;
      complete, based on the first wireless connection and the second wireless connection, a communication path between the end user device and the mobile wide area communication network; and
      transmit, using the communication path and based on the configuration settings, data to the mobile wide area communication network from the end user device.

2. The device of claim 1, where the processor is further to:
   receive, prior to completing the communication path between the end user device and the mobile wide area communication network, credential information from the end user device, including at least one of:
      an indication of a successful log into the end user device by a user, a security key,
a user name associated with the end user device,
a user password associated with the end user device,
a serial number of the end user device,
an enterprise-assigned identifier of the user, or
an enterprise-assigned identifier of the end user device;
retrieve, based on receiving the credential information from the end user device, stored credential information related to the device from the memory; and
compare a portion of the credential information from the end user device to the stored credential information related to the device,
where the processor, when completing the communication path between the end user device and the mobile wide area communication network, is to:
complete the communication path between the end user device and the mobile wide area communication network based on a successful result of comparing.

3. The device of claim 1,
where the processor is further to:
generate a request for a latest configuration file containing configuration information for configuring the device;
transmit the request to the configuration server using the first wireless connection;
receive the latest configuration file from the configuration server,
the latest configuration file being associated with the device; and
update the configuration settings of the device according to the configuration information in the latest configuration file.

4. The device of claim 1, where the processor is further to:
receive updated credential information from the configuration server using the first wireless connection;
store the updated credential information in the memory;
transmit the updated credential information to the end user device using the second wireless connection;
receive, using the second wireless connection, a subsequent connection request from the end user device to connect to the device,
the updated credential information being included in the subsequent connection request provided by the end user device;
complete, based on receiving the subsequent connection request, another connection between the device and the end user device; and
provide the end user device with access to the mobile wide area communication network using the other connection.

5. The device of claim 1,
where the configuration file received from the configuration server includes information:
identifying applications on a plurality of end user devices, the plurality of end user devices including the end user device, and
indicating whether at least one of the plurality of end user devices is prohibited from obtaining or is permitted to obtain access via the device to the mobile wide area communication network; and
where the processor is further to:
compare, based on a request from an application executing on the end user device to access the mobile wide area communication network, an application identifier included in the request to the information identifying applications prohibited from obtaining access or permitted to obtain access to the mobile wide area communication network via the device; and
selectively provide or deny, based on results of comparing, access to the mobile wide area communication network to the application.

6. The device of claim 1, where the processor is further to:
transmit, to the configuration server, a report of a measured quantity of data usage by the device;
receive, based on transmitting the transmitted report, an updated configuration file including a modified data usage setting,
where the modified data usage setting corresponds to a usage setting below a maximum data usage for a subscription period; and
adjust data usage configuration settings based on the modified data usage setting and based on the updated configuration file.

7. The device of claim 1, where processor is further to:
recognize a local area connection request requesting connection to the device,
the local area connection request being received from a second end user device,
the second end user device including a wireless access device management agent application, and
the local area connection request providing secure information identifying the second end user device; and
connect, based on the secure information identifying the second end user device provided in the local area connection request, to the second end user device.

8. The device of claim 1,
where a plurality of other end user devices are connected to the device, and
where the processor is further to:
measure data usage by measuring a quantity of data processed by the device,
the quantity of data processed by the device including:
data received by the device from the end user device and from each of the plurality of other end user devices, and
data transmitted from the device to the end user device and to each of the plurality of other end user devices;
compare the data usage to a threshold data usage for a subscription period,
the threshold data usage being a data usage below a maximum data usage for the subscription period;
determine, based on comparing the data usage to the threshold data usage, a value that indicates a probability that the maximum data usage for the device will exceed a particular usage value during the subscription period; and
report the value to the configuration server.

9. The device of claim 8, where the processor is further to:
identify, based on measuring the data usage, data usage of each of the plurality of other end user devices;
maintain the data usage of each of the plurality of other end user devices; and
report the data usage of each of the plurality of other end user devices to the configuration server.

10. The device of claim 1,
where a plurality of end user devices, including the end user device, are communicably connected to the device, and
where the processor is further to:

identify a particular end user device of the plurality of end user devices as a high data usage end user device;
determine if there is another device having a data usage that is less than data usage measured for the device; and
transfer, based on a measured quantity of data usage of the device in a subscription period being within a threshold quantity of data usage, a connection of the high data usage end user device from the device to the other device.

11. The device of claim 1,
where the processor is to:
access information from an integrated circuit card; and
adjust settings in the device based on the accessed information and the configuration file received from the configuration server.

12. A method, comprising:
establishing, using a first wireless communication transceiver of a device, a first wireless connection with an end user device;
establishing, using a second wireless communication transceiver of the device, a second wireless connection with a mobile wide area communication network;
transmitting, using the second wireless communication transceiver, information related to the device to a configuration server;
receiving, using the second wireless communication transceiver and based on transmitting information related to the device to the configuration server, configuration file from the configuration server,
the configuration file including operational rules related to use of the device by the end user device;
adjusting, by the device and based on the operational rules, configuration settings of the device;
completing, by the device and based on the first wireless connection and the second wireless connection, a communication path between the end user device and the mobile wide area communication network,
the end user device being communicably connected to the device; and
transmitting, by the device using the communication path and based on the configuration settings, data to the mobile wide area communication network from the end user device.

13. The method of claim 12, further comprising:
receiving, prior to completing the communication path between the end user device and the mobile wide area communication network, credential information from the end user device, where the credential information includes at least one of:
an indication of a successful log into the end user device by a user,
a security key,
a user name associated with the end user device,
a user password associated with the end user device,
a serial number of the end user device,
an enterprise-assigned identifier of the user, or
an enterprise-assigned identifier of the end user device;
retrieving, based on receiving the credential information from the end user device, credential information related to the device stored in a memory of the device; and
comparing a portion of the credential information received from the end user device to the credential information related to the device,
where completing the communication path between the end user device and the mobile wide area communication network comprises:
completing the communication path between the end user device and the mobile wide area communication network based on a successful result of comparing.

14. The method of claim 12, further comprising:
receiving a password from the configuration server;
storing the password;
transmitting the password to the end user device;
receiving a subsequent connection request from the end user device,
that the password being included in the subsequent connection request provided by the end user device;
completing, based on receiving the subsequent connection request, another connection between the device and the end user device; and
providing the end user device with access to the mobile wide area communication network using the other connection.

15. The method of claim 12, further comprising:
transmitting to the configuration server a report of a measured quantity of data usage by the device;
receiving, based on the report, an updated configuration file including a modified data usage setting,
where the modified data usage setting corresponds to a usage setting below a maximum data usage for a subscription period; and
adjusting data usage configuration settings based on the modified data usage setting and based on the updated configuration file.

16. The method of claim 12, further comprising:
recognizing a local area connection request requesting connection to the device,
the local area connection request being received from a second end user device,
the second end user device being equipped with a wireless access device management agent application, and
the local area connection request providing secure information identifying the second end user device; and
connect, based on the secure information identifying the second end user device provided in the local area connection request, to the second end user device.

17. A non-transitory computer-readable medium for storing instructions, the instructions comprising:
one or more instructions that, when executed by one or more processors of a device, cause the one or more processors to:
establish, using a first wireless communication transceiver of the device, a first wireless connection with an end user device;
establish, using a second wireless communication transceiver of the device, a second wireless connection with a mobile wide area communication network;
transmit, using the second wireless communication transceiver, information related to the device to a configuration server;
receive, using the second wireless communication transceiver and based on transmitting information related to the device to the configuration server, a configuration file from the configuration server,
the configuration file including operational rules related to use of the device by the end user device;

adjust, based on the operational rules, configuration settings of the device;

complete, based on the first wireless connection and the second wireless connection, a communication path between the end user device and the mobile wide area communication network,
the end user device being communicably connected to the device; and transmit, using the communication path and based on the configuration settings, data to the mobile wide area communication network from the end user device.

18. The non-transitory computer-readable medium of claim 17, where the one or more instructions further cause the one or more processors to:

transmit to the configuration server a report of a measured quantity of data usage by the device;

receive, based on the report, an updated configuration file including a modified data usage setting,
where the modified data usage setting corresponds to a usage setting below a maximum data usage for a subscription period; and adjust data usage configuration settings based on the modified data usage setting and based on the updated configuration file.

19. The non-transitory computer-readable medium of claim 17, where the one or more instructions further cause the one or more processors to:

recognize a local area connection request requesting connection to the device,
the local area connection request being received from a second end user device,
the second end user device being equipped with a wireless access device management agent application, and
the local area connection request providing secure information identifying the second end user device; and connect, based on the secure information identifying the second end user device provided in the local area connection request, to the second end user device.

20. The non-transitory computer-readable medium of claim 17, where the one or more instructions further cause the one or more processors to:

identify, based on measuring data usage by measuring a quantity of data processed by the device, data usage of each of a plurality of other end user devices;

maintain the data usage of each of the plurality of other end user devices in a memory of the device; and report the data usage of each of the plurality of other end user devices to the configuration server.

* * * * *